(12) United States Patent
Ohtani et al.

(10) Patent No.: US 7,071,979 B1
(45) Date of Patent: Jul. 4, 2006

(54) IMAGE SENSING APPARATUS AND METHOD

(75) Inventors: Atsushi Ohtani, Inagi (JP); Yasuhide Ueno, Hino (JP); Masashi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 08/878,581

(22) Filed: Jun. 19, 1997

(30) Foreign Application Priority Data

Jun. 28, 1996 (JP) .............................. 8-169716

(51) Int. Cl.
*H04N 7/18* (2006.01)
*H04N 9/04* (2006.01)

(52) U.S. Cl. .................. 348/269; 348/70; 358/509; 358/512; 235/462.42

(58) Field of Classification Search ............... 348/268, 348/269, 70, 270, 271, 222.1, 223.1, 224.1; 358/509, 512, 513, 516, 519; 235/462.42, 235/472.01
See application file for complete search history.

(56) References Cited

U.S. PATENT DOCUMENTS

| | | | | |
|---|---|---|---|---|
| 4,642,679 A | * | 2/1987 | Nagano | 358/509 |
| 4,731,661 A | | 3/1988 | Nagano | 358/509 |
| 5,398,061 A | * | 3/1995 | Miura et al. | 348/269 |
| 5,450,215 A | * | 9/1995 | Iwama | 358/509 |
| 5,532,825 A | * | 7/1996 | Lim et al. | 358/474 |
| 5,654,756 A | * | 8/1997 | Takahashi et al. | 348/268 |
| 5,877,487 A | * | 3/1999 | Tani et al. | 235/469 |

FOREIGN PATENT DOCUMENTS

| | | |
|---|---|---|
| JP | 1-167766 | 11/1989 |
| JP | 4-18849 | 1/1992 |
| JP | 4-368055 | 12/1992 |
| JP | 6-181506 | 6/1994 |

* cited by examiner

*Primary Examiner*—Ngoc-Yen Vu
*Assistant Examiner*—Gregory V. Madden
(74) *Attorney, Agent, or Firm*—Fitzpatrick, Cella, Harper & Scinto

(57) ABSTRACT

An image sensing apparatus senses an image by illuminating a document by a light source including three light emitting diodes which emit light of red, green, and blue so that the light reflected from the document is incident on a sensor array which in turn generates an electric signal corresponding to the incident light, wherein a predetermined light emitting diode is also turned on during a period in which no image sensing operation is performed thereby making it possible to stabilize the intensity of light illuminating an image. Thus, the invention provides a high-performance and small-sized image sensing apparatus at a low cost.

57 Claims, 28 Drawing Sheets

ENTRANCE SURFACE

IMAGE SENSING APPARATUS AND METHOD

BACKGROUND OF THE INVENTION

1. Field of the Invention

The present invention relates to a novel an image sensing apparatus for use in a color facsimile device, color copying apparatus, color scanner, or similar devices and to a novel method for sensing color images.

2. Description of the Related Art

In the art, the following three arrangements are known for sensing a color image:

a) A single light source, such as a xenon lamp, and color photoelectric conversion devices, each having its own color filter formed on its surface;

b) A single light source, such as a xenon lamp, and a color photoelectric conversion device in conjunction with a plurality of mechanically switched color filters; and c) Three light sources such as fluorescent lamps which emit light of R, G, and B (red, green and blue), and which are switched during an image sensing operation.

These known arrangements have the following problems. When the arrangement (a) used to sense a color image, three different photosensors corresponding to RGB colors are required. Furthermore, it is required to form a color filter on the surface of each sensor element. Thus, this arrangement is expensive. In the case of the arrangement (b), it is required that the light source emit high-intensity light to compensate for absorption of light by the color filters. Furthermore, the mechanism of switching the color filters is expensive, and it is difficult to realize a small-sized image sensing apparatus. In the arrangement (c), for example, three fluorescent lamps which emit light with spectrum peaks at three different wavelengths are used. However, fluorescent lamps exhibit long persistence. Furthermore, a long time is needed to stabilize the light intensity after being turned on. As a result, a complicated circuit is needed to control the operation of turning on the fluorescent lamps

SUMMARY OF THE INVENTION

It is an object of the present invention to provide a small-sized and low-cost image sensing apparatus.

It is another object of the present invention to provide an image sensing apparatus with a stable light source.

According to one aspect of the present invention, to achieve the above objects, there is provided an image sensing apparatus including: a plurality of light sources for emitting light with different wavelengths; image sensing means for sensing an image illuminated by the above light sources and outputting an image signal; and a light source controlling means for controlling the plurality of light sources so that a particular light source of the plurality of light sources is turned on during a period in which no image sensing operation is performed by the image sensing means.

The above construction makes it possible to provide an image sensing apparatus with a stable light source at a low cost. Furthermore, it also becomes possible to reduce the size of the image sensing apparatus.

According to another aspect of the invention there is provided a novel method for sensing and illuminating an image by a plurality of light sources which emit light with different wavelengths, thereby to sense the image and turning on a predetermined light source from the light sources during a period in which no sensing operation is being performed.

Other objects and features of the present invention will become apparent from the following detailed description and the accompanying drawings.

DESCRIPTION OF THE PREFERRED EMBODIMENTS

The present invention will be described in further detail below with reference to the preferred embodiments of the color image sensing apparatus of the present invention. In these embodiments, three LEDs (light emitting diodes) are used as light sources to emit light with different colors of red (R), green (G), and blue (B). However, the present invention is not limited to that. LEDs which emit light with another proper combination of colors capable of forming a color image may also be employed. For example, LEDs of yellow, cyan, and magenta may be employed. Furthermore, although monochrome-mode sensing is performed using a red LED in the following embodiment, an LED of another proper color may also be employed.

Furthermore, although in the following embodiments an image is sensed by detecting light reflected from a document, an image may also be sensed by detecting light passing through a document.

In the following embodiments, a single-line sensor array (line sensor) is used. However, a multiple-line sensor array may instead be used to scan an image.

In the following description, the term "color image sensing apparatus" is used, in accordance with common terminology, to describe an apparatus capable of sensing an image in either a color image sensing mode or a monochrome image sensing mode as desired. Note that the terms "color image sensing" and "monochrome image sensing" refer to sensing operations in the color image sensing mode or monochrome image sensing mode, and thus do not refer to the operation of sensing a color document or a monochrome document. When an image is sensed in the monochrome mode, the operation will be referred to as the monochrome image sensing even if the image is a color image.

Conversely, when an image is sensed in the color mode, the operation will be referred to as color image sensing, even if the image is monochrome.

Specific Embodiments

Embodiment 1

Figure 1:
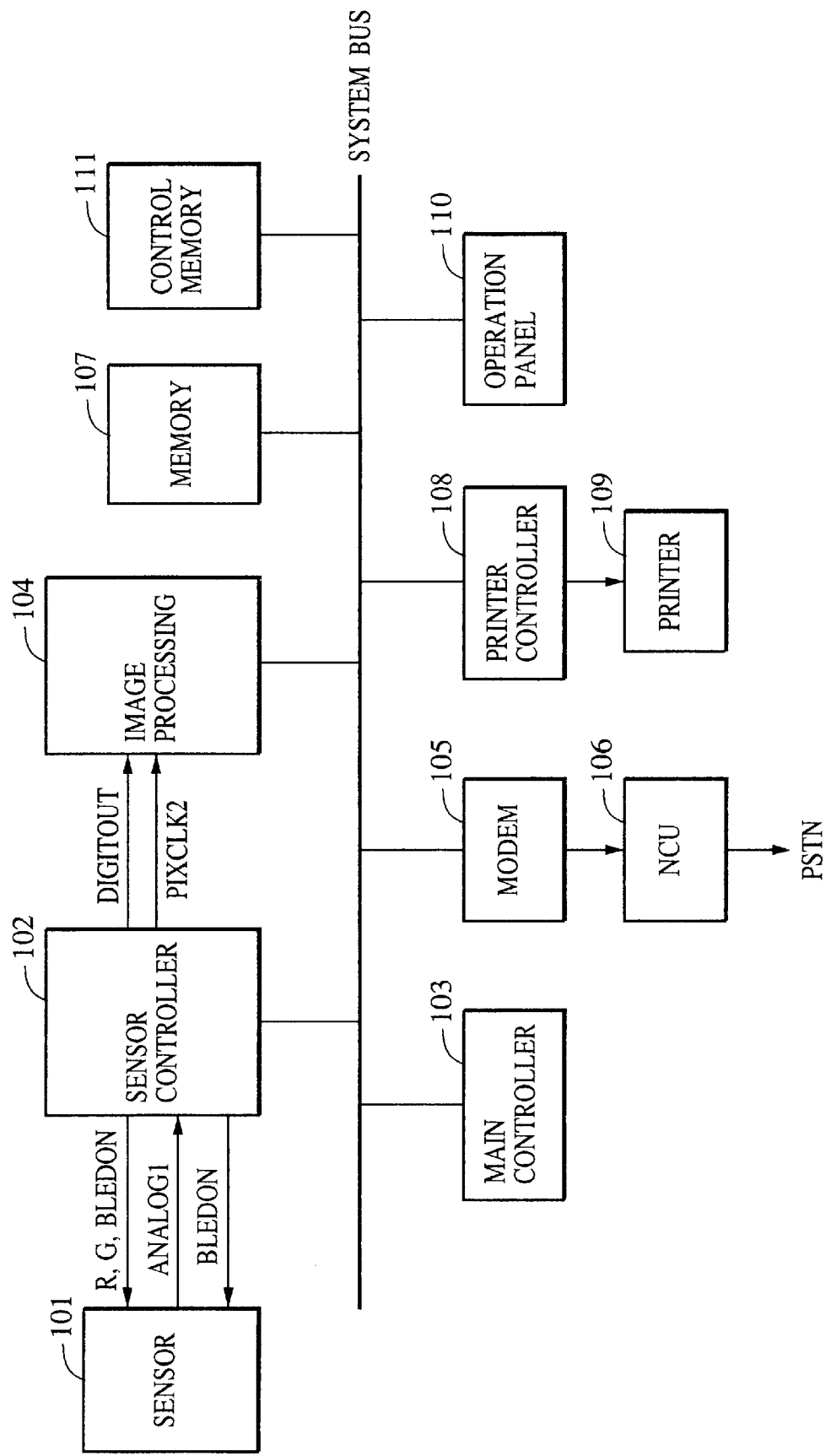
FIG. 1 is a block diagram illustrating the construction of a system which incorporates a first embodiment of the invention.

FIG. 1 is a block diagram illustrating the construction of a "facsimile" system which incorporates a first embodiment of the present invention. As shown in FIG. 1, the system includes: an image sensor 101 for converting light intensity into a corresponding electric signal; a sensor controller 102 for controlling the operation of the image sensor 101; a main controller 103 for controlling the entire parts of the image sensor system; an image processing unit 104 for performing image processing on a signal input from the sensor controller 102 and outputting a resultant signal wherein the image processing is performed in a different manner depending on a specified mode; a modem 105 for performing modulation and demodulation on data received or data to be transmitted; an NCU (network configuration utility) 106 for controlling the connection to a public switched telephone network; an image memory 107 for storing image data; a printer controller 108 for controlling the operation of outputting printing data to a printer; a printer controller 108 for controlling printing data output to a printer; a printer 109 for printing an image under the control of the printer controller 108; and an operation panel 110 via which an operator operates the system; a control memory for storing control programs of the controller 102, 103, 108.

Figure 2:
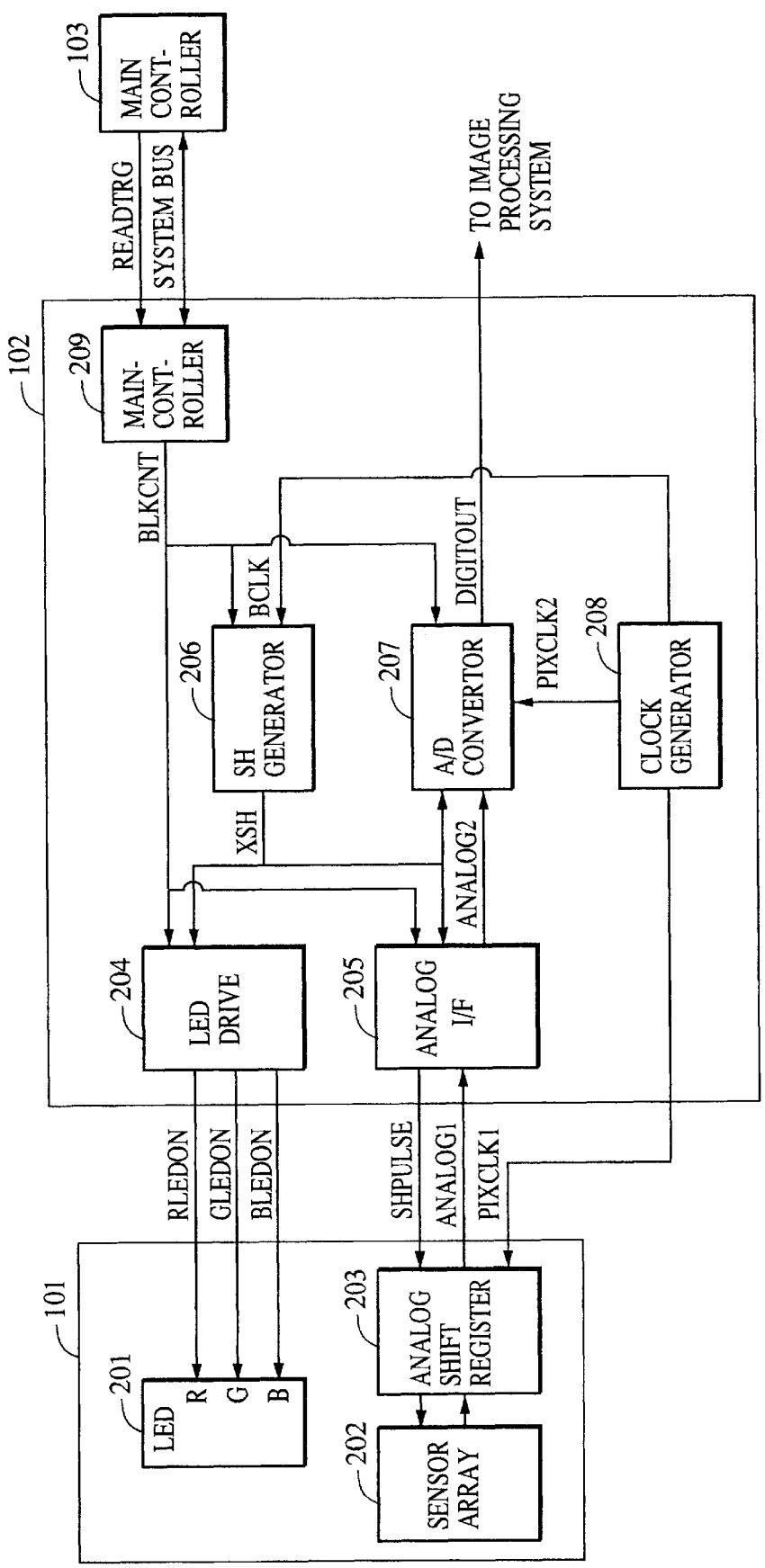
FIG. 2 is a block diagram illustrating in greater detail the construction of some of the elements of the system of FIG. 1.

FIG. 2 is a block diagram illustrating the construction of the sensor 101 and the sensor controller 102. As shown in FIG. 2, the signal processing system includes: light source LEDs 201 for emitting light with three different colors of red, green, and blue which are separately turned on and off so as to illuminate a document; a sensor array 202 for generating an electronic charge corresponding to the intensity of light which is incident on the sensor array 202 after the light has been reflected from a document illuminated by the light source LEDs 201; an analog shift register 203 including register elements corresponding in a one-to-one fashion to the respective elements of the sensor array 202 and serving to temporarily store charges accumulated in the respective elements of the sensor array 202; an LED driver 204 for controlling the operation of turning on and off the light source LEDs 201 in accordance with the programs stored in the control memory 111; an analog input interface 205 via which analog data from the analog shift register 203 is input; a synchronizing signal generator 206 for generating a synchronizing signal for controlling the sensing operation; an analog-to-digital converter 207 for quantizing an analog signal received via the analog input interface 205; a clock generator 208 for generating a clock for controlling the operation of the sensor; and an analog block main controller 209 for controlling each block of the sensor controller 102 under the control of the main controller 103 (FIG. 1).

In FIG. 2, BLKCNT denotes a plurality of control signals for controlling the respective blocks in the sensor controller 102 under the control of the main controller 103. XSH denotes an image sensing synchronizing signal generated by the synchronizing signal generator 206. ANALOG1 is a first analog signal 1 generated by the sensor array 202, and ANALOG2 is a second analog signal 2 which is input via the analog input interface 205. DIGITOUT denotes a digital output signal from the analog-to-digital converter 207. PIXCLK1 is a data transfer clock signal 1 for controlling the operation of transferring the analog data ANALOG1 from the sensor array 202 to the analog input interface 205, and PIXCLK2 is a data transfer clock signal 2 for controlling the operation of transferring the analog data ANALOG2 from the analog input interface 205 to the analog-to-digital converter 207. BCLK denotes a clock signal for driving the synchronizing signal generator 206. SHPULSE is a transfer pulse for controlling the operation of transferring the data accumulated in the sensor array 202 to the analog shift register 203. RLEDON is a control signal generated by the LED driver 204 to drive a red LED, GLEDON is a control signal generated by the LED driver 204 to drive a green LED, and BLEDON is a control signal generated by the LED driver 204 to drive a blue LED. READTRG is a trigger signal used to start an operation of sensing one line of image.

Figure 3:
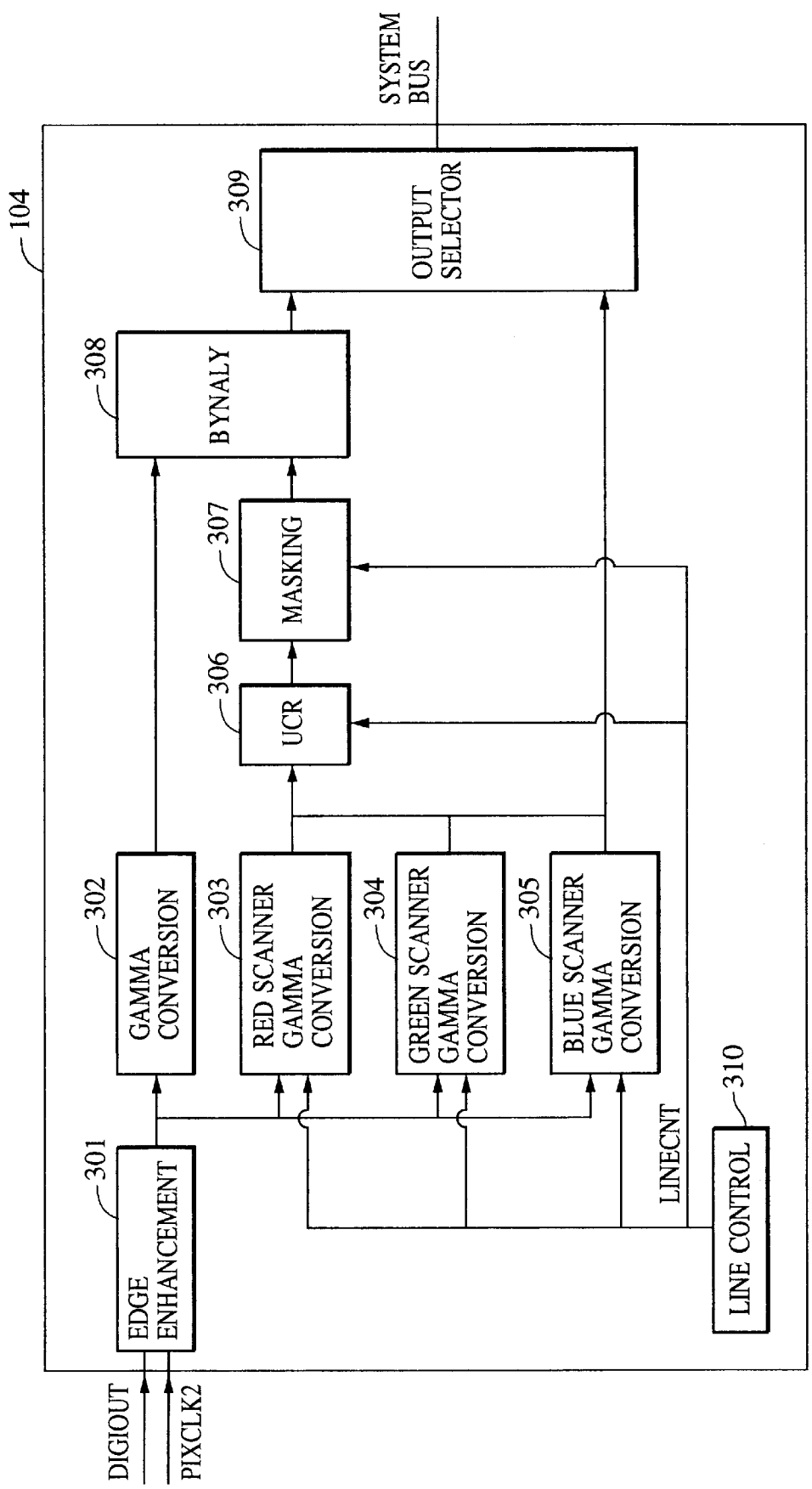
FIG. 3 is a block diagram illustrating in greater detail the construction of an image processing unit in the system of FIG. 1.

FIG. 3 is a block diagram illustrating the details of the image processing unit 104. As shown in FIG. 3, the image processing unit 104 includes: an edge enhancing circuit 301 which detects the edge of an image and processes the detected signal so as to enhance the edge; a gamma conversion circuit 302 for performing gamma conversion on the input data in the monochrome mode; an R (red) gamma conversion circuit 303 for performing gamma conversion on R data in the color mode and outputting a resultant C (cyan) data; a G (green) gamma conversion circuit 304 for performing gamma conversion on G data in the color mode and outputting resultant M (magenta) data; a B (blue) gamma conversion circuit 305 for performing gamma conversion on B data in the color mode and outputting a resultant Y (yellow) data; a UCR (under color removal) processing circuit 306 for generating a K (black) component from the above C, M, and Y data; a masking circuit 307 for performing matrix operation on the C, M, Y, and X data, and generating corresponding C', M', Y', K' data; a binarization circuit (BYNALY) 308 for converting each pixel data represented in a plurality of bits into a single binary bit data; an output selector 309 for selecting output data and outputting the selected data; and a line controller 310 for controlling the color of a line being sensed in the color sensing mode.

Figure 4:
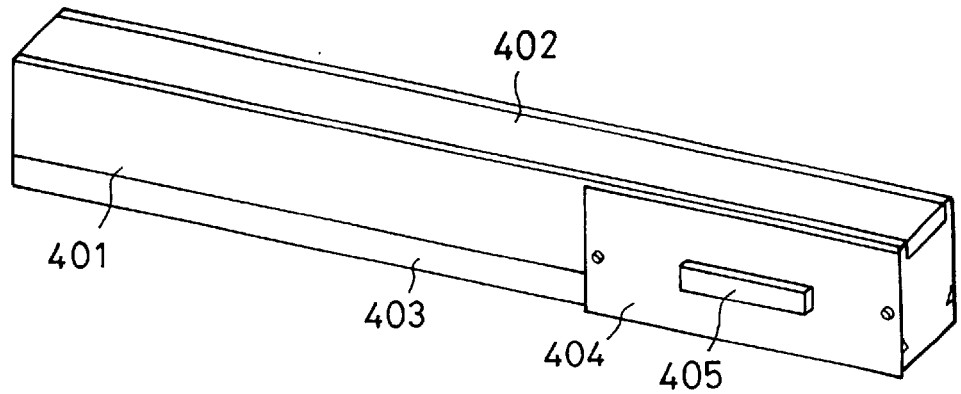
FIG. 4 is a perspective view illustrating the external form of an image sensor which may be used in the system of FIG. 1.
Figure 5:
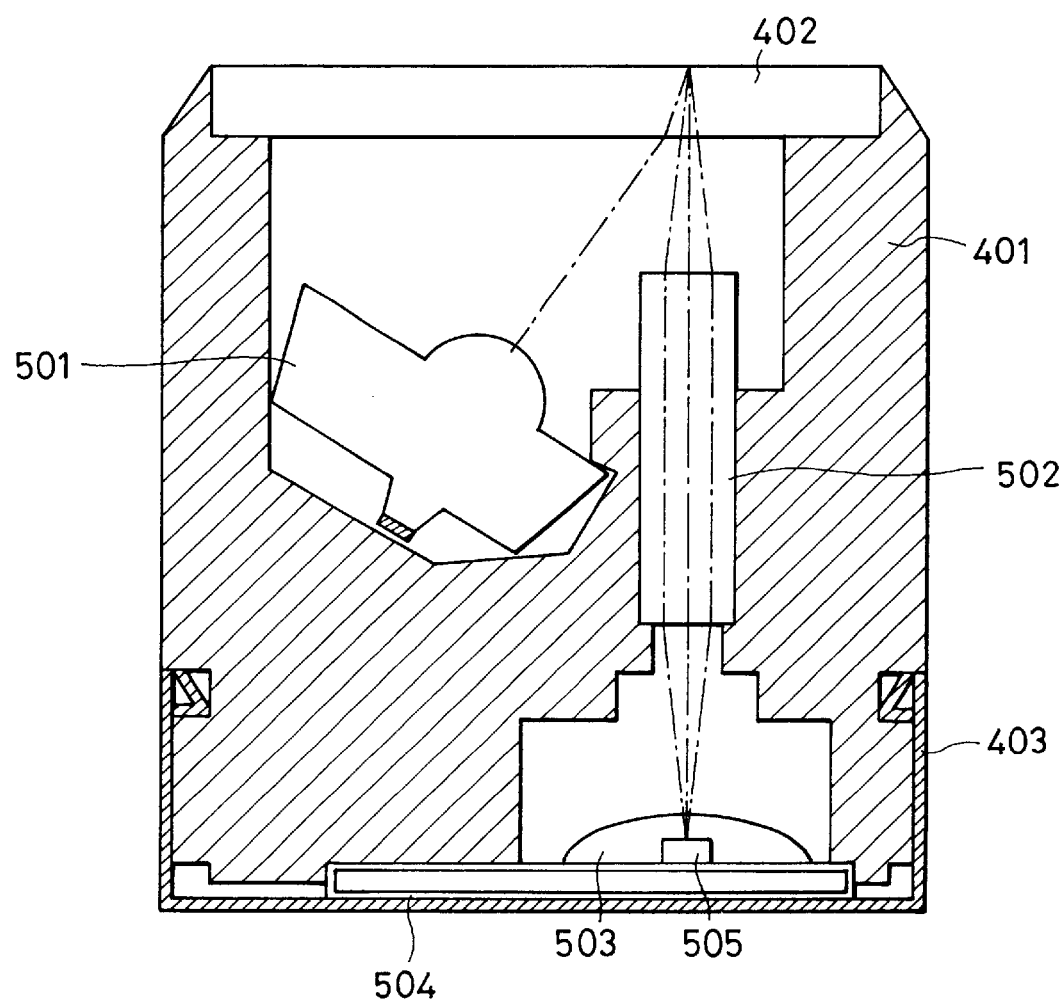
FIG. 5 is an enlarged cross-sectional view illustrating the internal structure of the image sensor of FIG. 4.

FIG. 4 is a perspective view illustrating the external form of the image sensor 101. As shown in FIG. 4, the image sensor 101 includes: an enclosure frame 401; a transparent glass plate 402 disposed such that its surface comes in contact with a document; a bottom plate 403; a connector plate 404; and a connector 405. FIG. 5 is a cross-sectional view illustrating the internal structure of the image sensor 101. As shown in FIG. 5, the image sensor 101 includes: a light source 501 with a light-guide for receiving R, G, and B light emitted from LED chips (not shown) which are disposed on either end of the light-guide, and directing the received light toward a document so that the surface of the document is uniformly illuminated by the light; an optical lens 502 consisting of an imaging element array with a short focal distance for focusing the light reflected from a document onto a sensor array 505; a protective film 503 coated on the surface of the sensor array; and a sensor substrate 504 on which the sensor array 505 is disposed, wherein the sensor array 505 includes a plurality of sensor chips arranged along a straight line.

Figure 6:
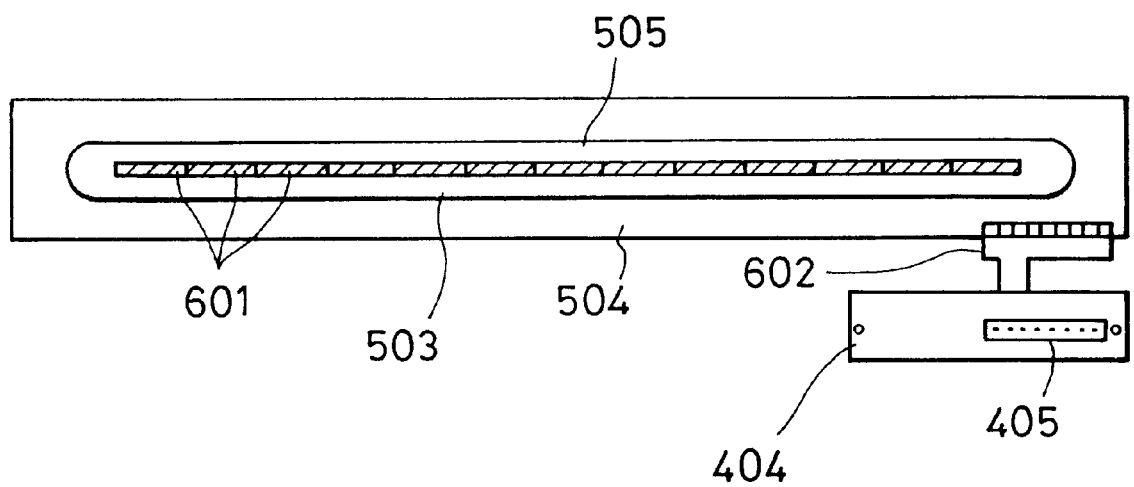
FIG. 6 is a schematic diagram illustrating the layout of a sensor board which forms a portion of the image sensor of FIG. 4.

FIG. 6 is a schematic diagram illustrating the layout of the sensor substrate of the image sensor 101. As shown in FIG. 6, the sensor substrate includes: sensor chips 601 each including a plurality of photoelectric conversion elements disposed along a straight line; and a flexible cable 602.

Figure 7A:
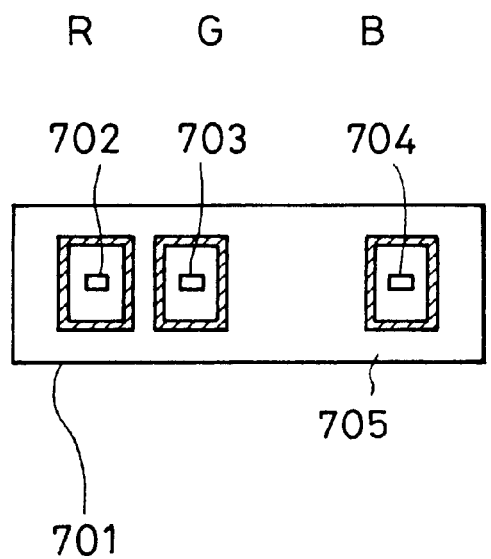
FIGS. 7A and 7B are schematic diagrams illustrating, the arrangement of LEDs (light emitting diodes) in the image sensor of FIG. 4.
Figure 7B:
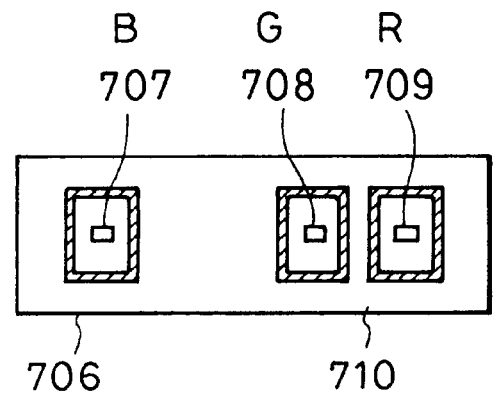
Figure 8:
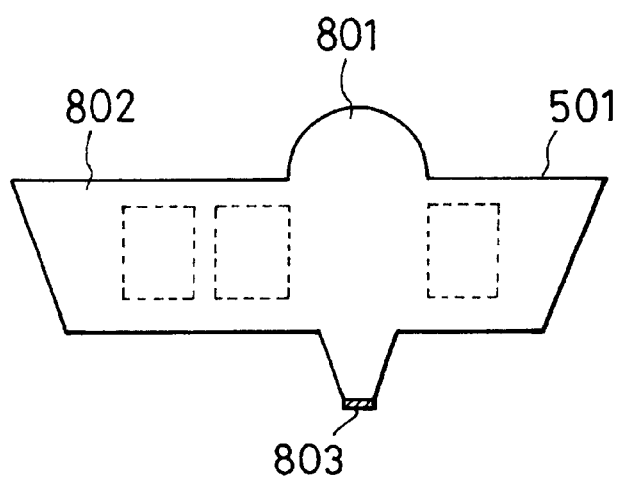
FIG. 8 is a cross-sectional view of a light source with a light-guide used in the image sensor of FIG. 4.

The sensor array 505 is a multi-chip line sensor having a plurality of sensor chips 601 arranged on the sensor substrate 504 wherein each sensor chip 601 has a plurality of photoelectric conversion elements disposed along a straight line. The sensor array 505 is entirely covered with the protective film 503. When a cellhock lens is used in the optical system, an image of a document is formed on the sensor array wherein the resultant image has a size equal to the original document. Therefore, in this case, the number of sensor chips 601 disposed on the sensor array 505 to sense a document depends on the size of the document to be sensed. FIGS. 7A and 7B are schematic diagrams illustrating the locations of LEDs disposed on the LED substrate of the image sensor 101. In FIG. 7A, reference numeral 701 denotes an LED light source 1 having three LEDs of R, G, and B, in which reference numeral 702 denotes a red LED chip 1, 703 denotes a green LED chip 1, 704 denotes a blue LED chip 1, 705 denotes a LED substrate 1. Similarly, in FIG. 7B, reference numeral 706 denotes an LED light source 2 having three LEDs of R, G, and B, in which reference numeral 707 denotes a blue LED chip 2, 708 denotes a green LED chip 2, 709 denotes a red LED chip 2, and 710 denotes a LED substrate 2. FIG. 8 is a cross-sectional view of the light source 501 with the the light-guide of the image sensor 101. As shown in FIG. 8, the light source 501 includes: a focusing part 801 for focusing light reflected by a reflector 803 onto a particular portion of a document to be sensed; and a light-guide 802 for transmitting light emitted from the LED chips (FIGS. 7A and 7B) in a longitudinal direction of the light-guide, wherein the reflector 803 serves to reflect the light which is incident on the reflector 803 after being transmitted via the light-guide so that the light is directed toward a document.

Figure 9:
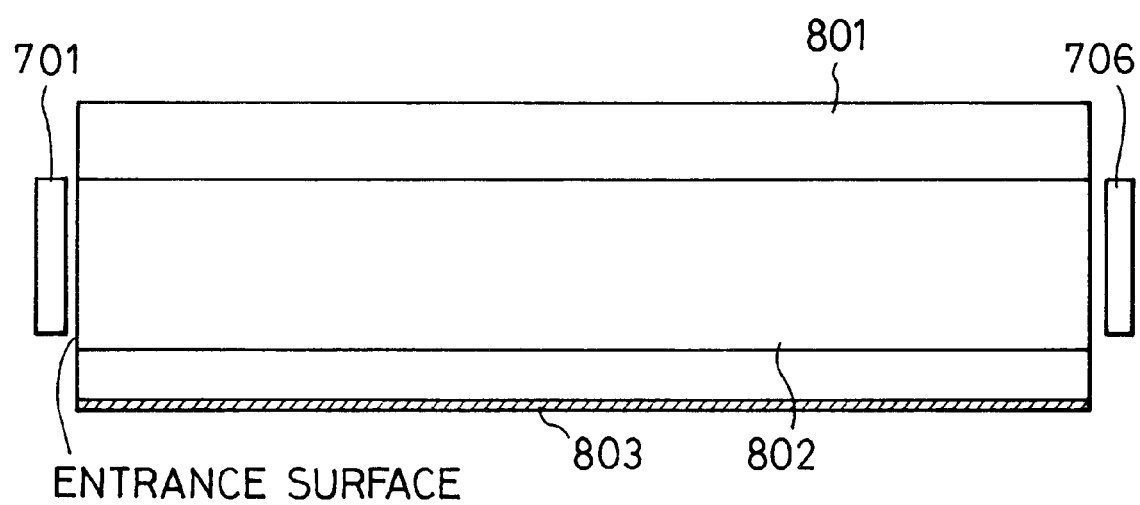
FIG. 9 is a schematic diagram illustrating the layout of a light-guide and LED light sources used in the image sensor of FIG. 4.

As shown in the schematic diagram of FIG. 9, each substrate 701 and 706 has three LEDs for emitting light of red, green, and blue, respectively. The respective LED light sources 701 and 706 are attached to either longitudinal end of the light-guide 802.

Figure 10:
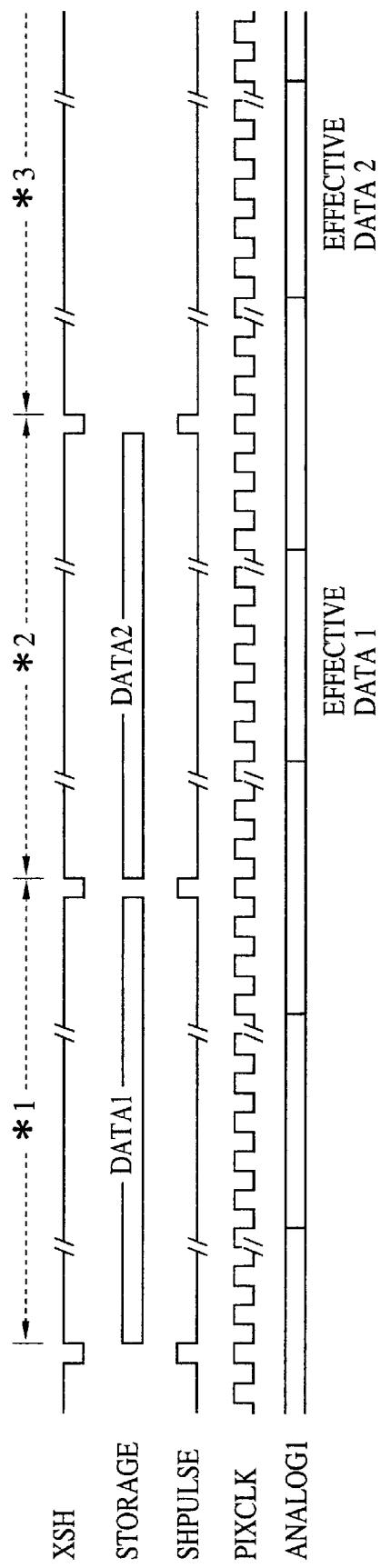
FIG. 10 is a timing chart illustrating an analog signal transferring sequence used in the operation of the system of FIG. 1.
Figure 11:
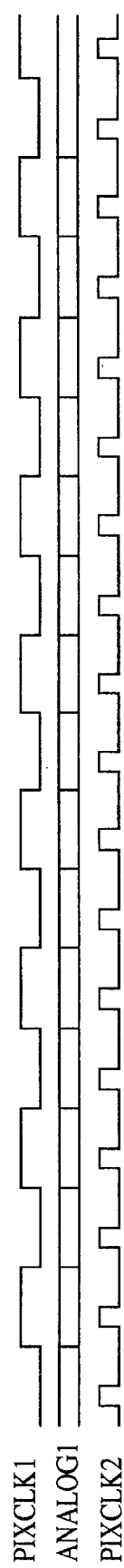
FIG. 11 is a timing chart further illustrating the analog signal transferring sequence used in the operation of the system of FIG. 1.

FIGS. 10 and 11 are timing charts illustrating the operation of transferring the analog signal ANALOG1.

One line of image is sensed as follows. A document is illuminated by light emitted by the light source LED 201 of the image sensor 101. The light reflected by the document is incident on the sensor array 202. In response to the reception of the light, the sensor array 202 generates a charge whose amount corresponds to the amount of the received light. The charge is accumulated in capacitors which are disposed on the sensor array 202 in such a manner that each sensor element has one capacitor. The operation of storing the charge is continued as long as the XSH signal is at a high level. If the XSH signal falls to a low level, the accumulation operation is terminated. When an SHPULSE signal is generated in synchronization with the XSH signal and input to the image sensor 101, the accumulated charges are transferred to the analog shift register 203.

The charges supplied to the analog shift register 203 are shifted in synchronization with the clock signal PIXCLK1 generated by the clock generator 208, and a corresponding analog signal ANALOG1 is output to the analog input interface 205. The analog input interface 205 samples and holds the signal ANALOG1 and then outputs a signal ANALOG2 to the analog-to-digital converter 207. In response to the clock signal PIXCLK2, the analog-to-digital converter 207 converts the signal ANALOG2 to a digital signal DIGITOUT which is supplied, for example, to the image processing system. The signal DIGITOUT is output in response to a trigger signal READTRG generated by the main controller 103. When no READTRG is generated, the signal DIGITOUT is not output or treated as an invalid signal.

As described earlier, the image signal is processed line by line. That is, the operation of sensing one line of image is performed in synchronization with the XSH signal. The data is then stored and output in such a manner that the data stored during a time period denoted by *1 is output during a time period *2, as shown in FIGS. 10 and 11. Thus, the data output from the sensor 101 has a delay of one XSH period from the storage operation. The operation of sensing one line of image is started in response to the trigger signal READTRG, and then accumulation operation is performed during the following period of XSH.

The flow of sensed data will be described below for each sensing mode.

Transmission in Monochrome Mode

The signal ANALOG1 output from the image sensor 101 is input to the analog input interface 205. After being sampled and held, the signal is transferred from the analog input interface 205 to the analog-to-digital converter 207. The analog-to-digital converter 207 quantizes the received signal and outputs the resultant signal DIGITOUT consisting of 8 bits per pixel. The signal DIGITOUT is supplied to the image processing unit 104. In the image processing unit 104, the edge of the signal DIGITOUT is enhanced by the edge enhancing circuit 301. The signal is then subjected to gamma conversion in the gamma conversion circuit 302, and is further converted to a signal in a single binary bit form by the binarization circuit 308. The resultant binary data is then encoded and stored in the image memory 107. The data is then analog-modulated by the modem 105 and output via the NCU 106 to the public switched telephone line.

Copying Operation on Monochrome Mode

The signal ANALOG1 output from the image sensor 101 is input to the analog input interface 205 and sampled and held. The signal is then quantized by the analog-to-digital converter 207 and output as a signal DIGITOUT consisting of 8 bits per pixel. The signal DIGITOUT is then input to the image processing unit 104. In the image processing unit 104, the edge of the signal DIGITOUT is enhanced by the edge enhancing circuit 301. The signal is then subjected to gamma conversion in the gamma conversion circuit 302, and is further converted to a signal in a single binary bit form by the binarization circuit 308. The resultant binary data is encoded and stored in the image memory 107. The data is sequentially transferred from the memory 107 to the printer controller 108. The printer controller 109 converts the data into a proper form and supplies the resultant data to the printer 109.

Copying Operation on Color Mode

The signal ANALOG1 output from the image sensor 101 is input to the analog input interface 205 and sampled and held. The signal is then quantized by the analog-to-digital converter 207 and output as a signal DIGITOUT consisting of 8 bits per pixel. The signal DIGITOUT is supplied to the image processing unit 104. In the image processing unit 104, the edge of the signal DIGITOUT is enhanced for each color by the edge enhancing circuit 301. R and G data are then converted to C and M data respectively by the scanner gamma conversion circuits 303 and 304 provided for the respective colors. The resultant C and M data are temporarily stored.

Following the R and G line data, B line data is input to the blue scanner gamma conversion circuit 305 and converted to Y data. The resultant Y data is supplied together with the corresponding C and M pixel data to the UCR processing circuit 306. The UCR processing circuit 306 generates a K (black) component for each pixel. After that, the masking processing circuit 307 performs a masking process on the data by means of a matrix operation. The data is then binarized by the binarization circuit 308. The binarized C, M, Y and K data are stored in the image memory 107. The data is then transferred from the memory 107 to the printer controller 108. The printer controller 109 converts the data into a proper form and supplies the resultant data to the printer 109.

The operation of switching the light sources by LED driver 204 in accordance with the programs stored in the control memory 111 is described below.

Figure 12:
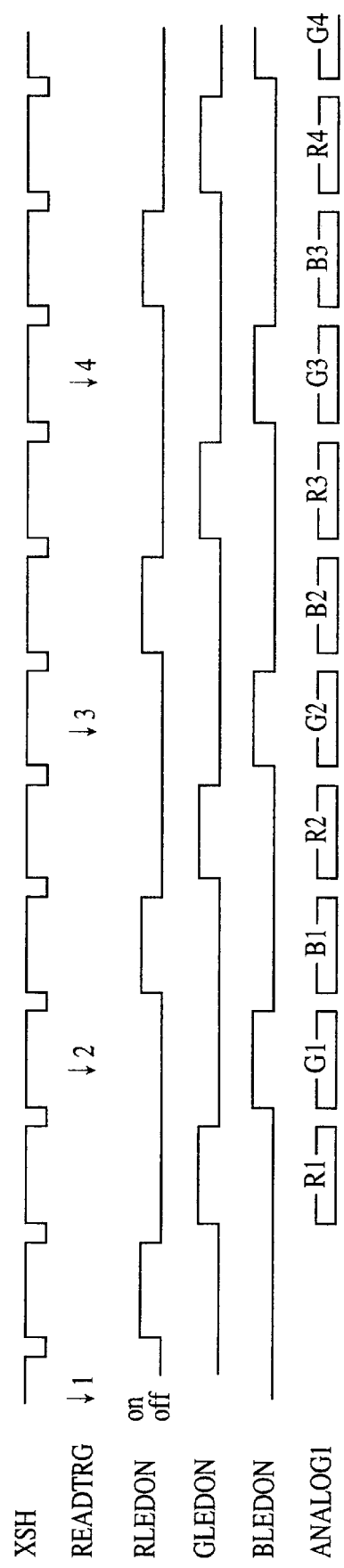
FIG. 12 is a timing chart illustrating an LED switching sequence performed during a color image sensing operation according to the present invention.

FIG. 12 illustrates an operation sequence of switching three different LEDs so as to successively sense documents in the color sensing mode. In the specific example described herein, the accumulation period for each color of R, G, and B is equal to one XSH (synchronizing) period; and light source LEDs are switched at intervals of one XSH in the order R, G, and B.

Figure 13:
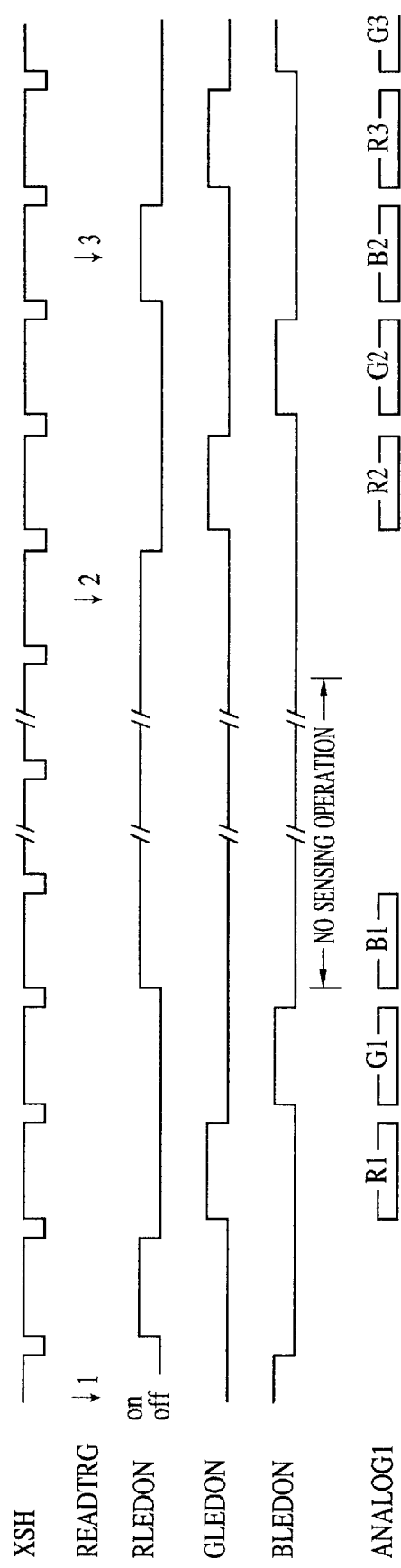
FIG. 13 is a timing chart similar to FIG. 12 but illustrating a sequence which occurs when no color image sensing operation is performed.

FIG. 13 illustrates an operation sequence of switching the LEDs for the case where the image sensing operation is paused in the middle of the color-mode operation in which three light sources are switched as shown in FIG. 12.

The switching operation of the LEDs is controlled by the LED driver 204. The LED driver 204 outputs signals RLEDON, GLEDON, and BLEDON to the three light source LEDs (RED, GREEN, BLUE), respectively. Each LED is turned on if the given signal (RLEDON, GLEDON, or BLEDON) is at a high level while the LEDs are turned off when the given signal is at a low level.

During the image sensing operation, the light source LEDs are switched at intervals of one XSH in the order R, G, B, as described above. However, when the operation is in a non-sensing period, the R LED is maintained in an on-state until the image sensing operation is restarted so that effective data is output from the image sensor 101 immediately after the image sensing operation is restarted. This is because the timing of outputting analog data from the image sensor is delayed by one XSH from the storage operation. Another reason for maintaining the R LED in the on-state is that the R LED needs a longer time to reach a stable state after being turned on than is needed by either the G or the B LED.

Figure 14:
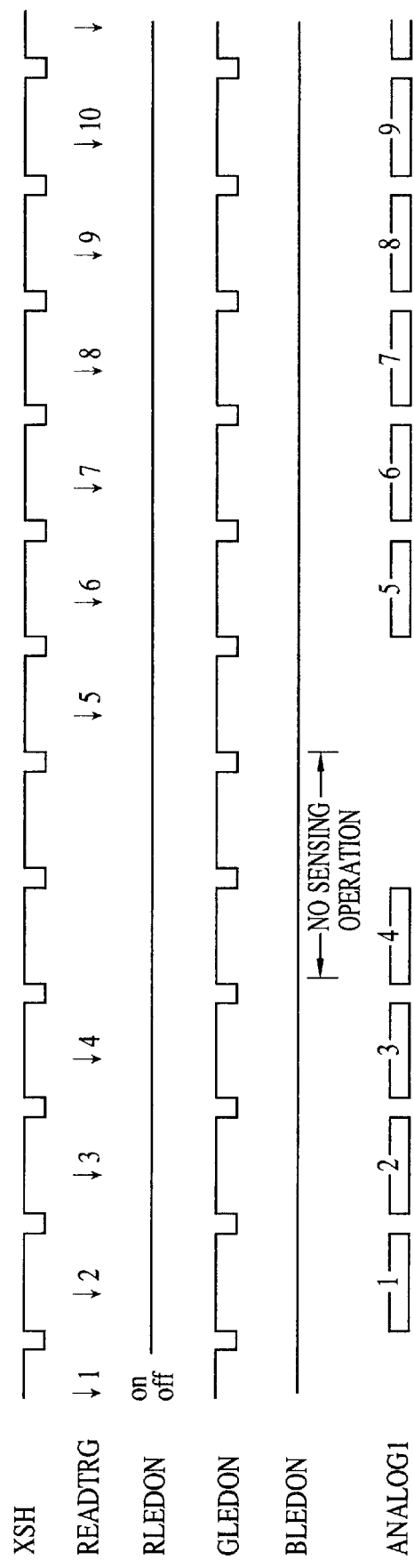
FIG. 14 is a timing chart similar to FIG. 12 but illustrating an LED switching sequence performed during a monochrome image sensing operation.
Figure 15:
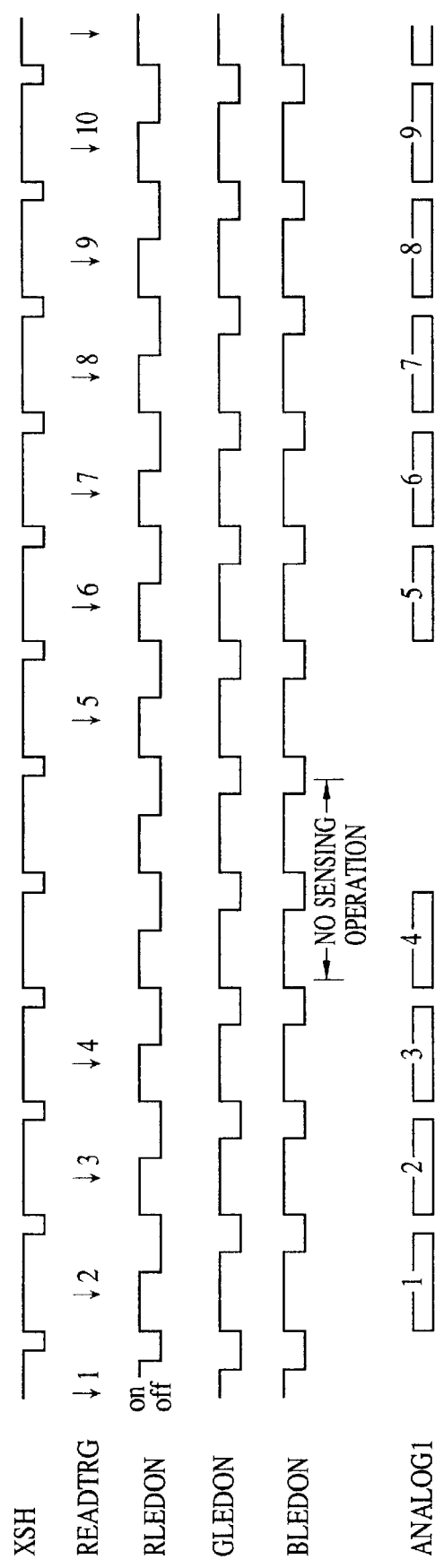
FIG. 15 is a timing chart similar to FIG. 12 but illustrating an LED switching sequence performed when a monochrome image is sensed using a pseudo-white light source.

FIG. 14 illustrates an operation sequence of switching an LED for the case where a document is sensed using one light source in a monochrome sensing mode. FIG. 15 illustrates an operation sequence of switching LEDs for the case where all three light sources are turned on at the same time so that they act as a pseudo-white light source thereby sensing a document in a monochrome sensing mode.

Figure 16:
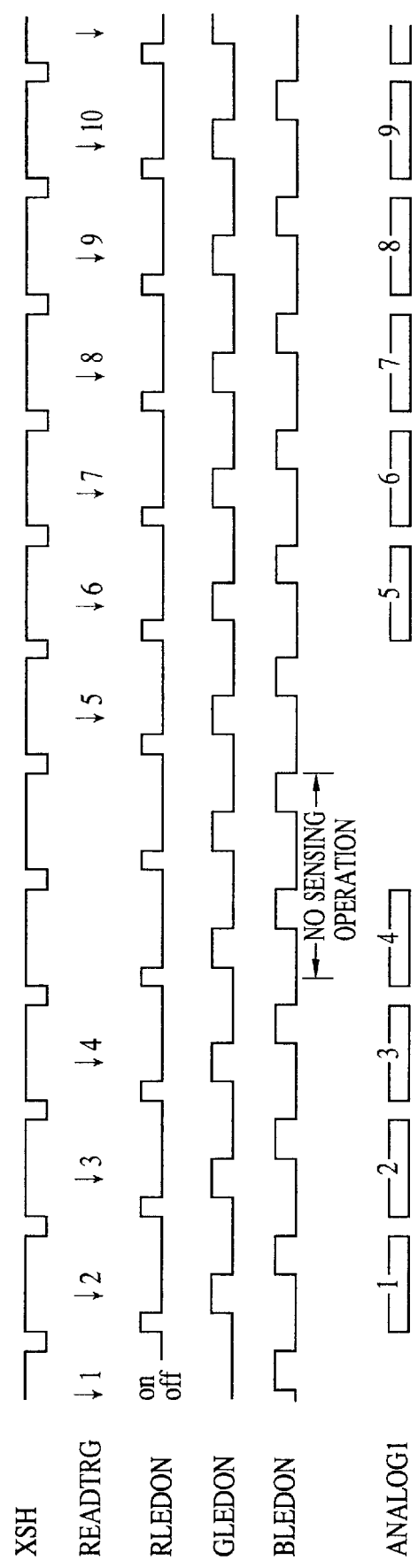
FIG. 16 is a timing chart similar to FIG. 12 but illustrating an LED switching sequence performed when a monochrome image is sensed using a pseudo-white light source.

Furthermore, FIG. 16 illustrates an operation sequence of switching LEDs for the case where three light sources are sequentially turned on during each period of XSH so that they act as a pseudo-white light source thereby sensing a document in a monochrome sensing mode. This technique is achieved in a "time-division" fashion since the same area of a document is illuminated sequentially by three different light sources. In the techniques shown in FIGS. 15 and 16, the R LED is turned on for a shorter period than the G and B LEDs since the R LED emits higher-intensity light than the G and B LEDs.

In the cases shown in FIGS. 14–16, the LEDs are turned on in a similar manner in both an image sensing operation period and a non-image sensing operation period.

Figure 17:
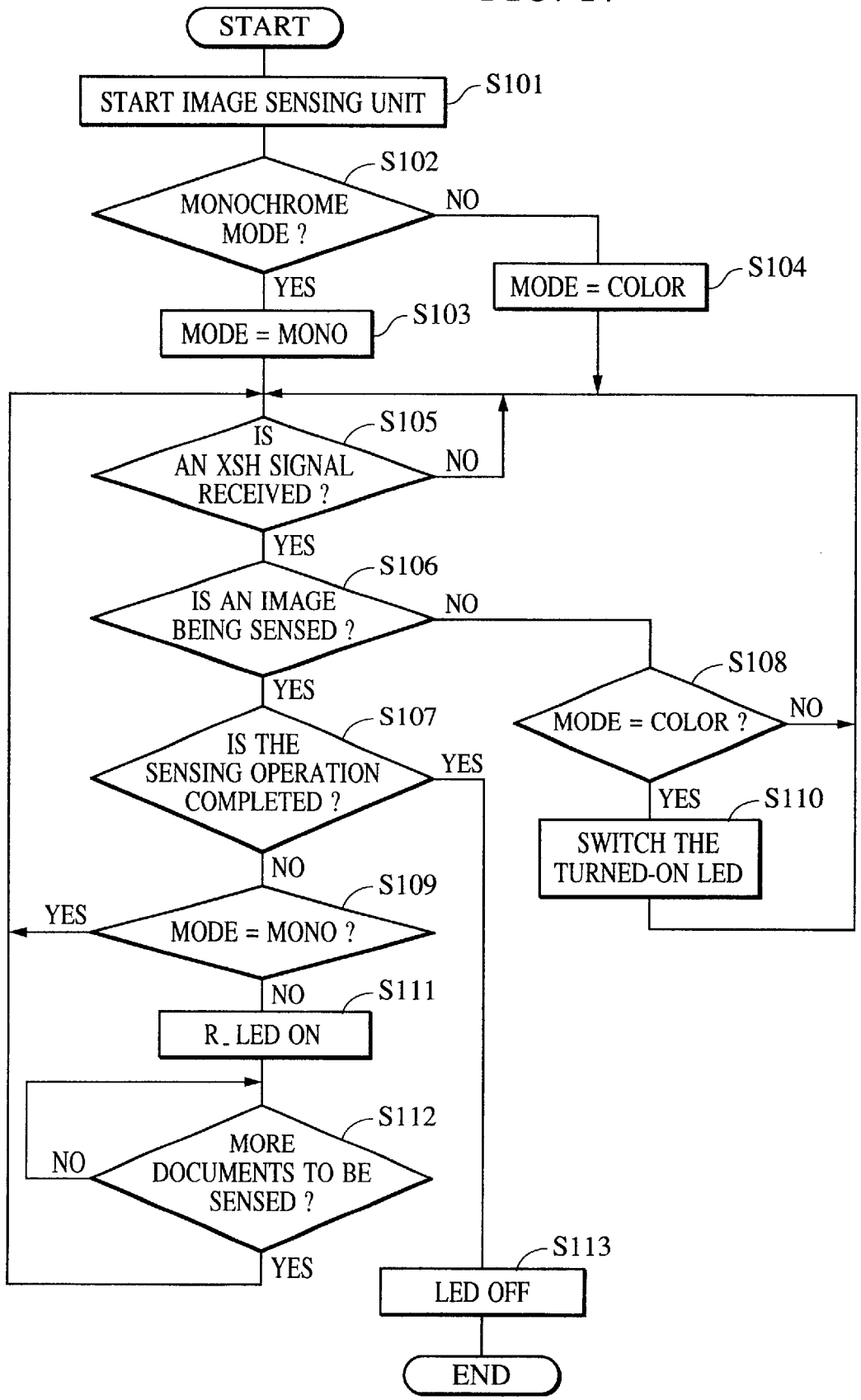
FIG. 17 is a flow chart illustrating the switching control operation of LEDs according to the first embodiment of the invention.

FIG. 17 is a flow chart illustrating the operation of switching the LEDs.

If the image sensing system is started in response to an operation of an operator via the operation panel 110 (step S101), the LED driver 204 is set to a monochrome or color mode in accordance with the specified image sensing mode (steps S103 and S104).

Then an image sensing operation is started. At each rising edge of the XSH signal (step S105), the status of the image sensing operation is monitored (step S106). If the operation is in the middle of sensing a document in the monochrome mode, the process returns to step S105 to detect a next XSH signal. In the case where the operation is in the middle of sensing a document in the color mode, the LEDs are sequentially switched in the order R, G and B (step S110).

If it is concluded that the operation is in a non-sensing period (step S107), it is judged whether the operation is in the monochrome mode or color mode (step S109). If the operation is in the monochrome mode, the same processing steps are repeated as in the image sensing period. On the other hand, if the operation is in the color mode, the operation of sequentially turning on R, G, and B LEDs is stopped and only the R LED is turned on (step S111). This state is maintained until another document to be sensed is given and the operation is restarted. If an image sensing operation is restarted (step S112), the operation of sequentially switching R, G, and B LEDs is restarted. If it is concluded in step S107 that the image sensing operation is completed, the LEDs are turned off (step S113) and the entire process is completed.

In the present embodiment, as described above, three different LEDs are used as light sources to emit light having spectrum peaks at R, G, and B, respectively. These three LEDs are sequentially switched in the order R, G, and B so that the same area of a document is illuminated by these LEDs during an image sensing operation. This makes it possible to sense an image in the color mode using a single sensor with a simple structure. Thus it is possible to achieve a small-sized image sensing system at a low cost.

Embodiment 2

In this second embodiment, the LEDs are turned off during a non-sensing period. This embodiment may be achieved with hardware similar to that employed in the first embodiment described above in reference with FIGS. 1–12, and therefore the hardware is not described in further detail here.

Figure 18:
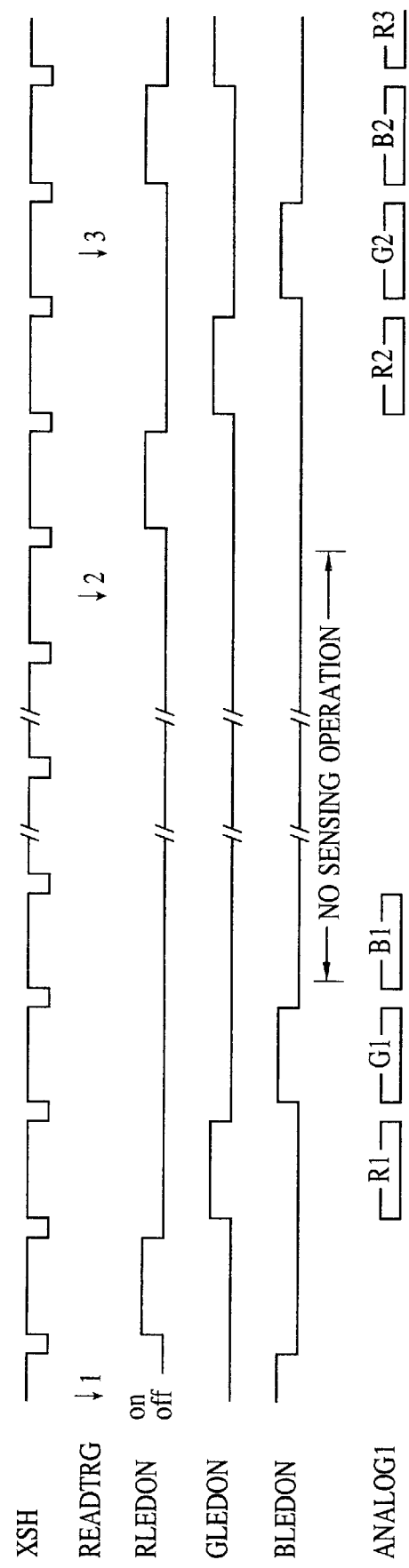
FIG. 18 is a timing chart illustrating the operation of switching LEDs in a color image sensing mode during a period in which no image sensing operation is performed, according to a second embodiment of the invention.

FIG. 18 illustrates an operation sequence of switching the LEDs according to the present embodiment, for the case where the image sensing operation is paused in the middle of a color-mode operation in which the three light sources is sequentially turned on.

The red LED is turned on in an XSH period following a trigger signal READTRG and accumulation operation is performed. Therefore, an effective output analog signal is delayed by one XSH period compared to the first embodiment in which the red LED is maintained in an on-state during a non-sensing period.

In the monochrome sensing mode, the LEDs are turned off as in the color sensing mode and a particular LED specified for use in the monochrome mode is turned on when the sensing operation is restarted.

Figure 19:
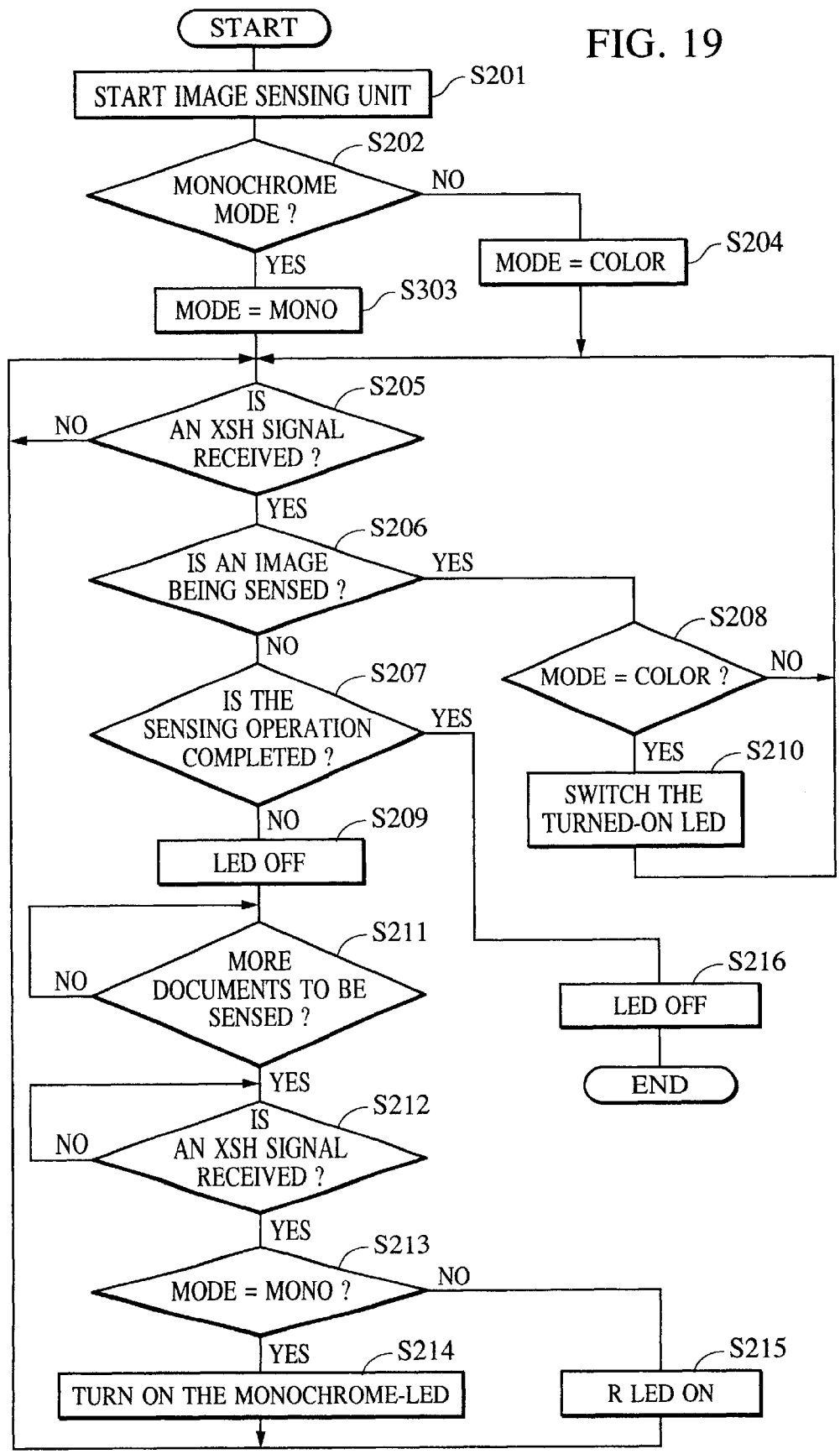
FIG. 19 is a flow chart illustrating the switching control operation of LEDs according to the second embodiment of the invention.

FIG. 19 is a flow chart illustrating the operation of turning on the LEDs. If the image sensing system is started in response to an operation of an operator via the operation panel 110 (step S201), the LED driver 204 is set to a monochrome or color mode in accordance with the specified image sensing mode (steps S203 and S204).

Then an image sensing operation is started. At each rising edge of the XSH signal (step S205), the status of the image sensing operation is monitored (step S206). If the operation is in the middle of sensing a document in the monochrome mode, the process returns to step S205 to detect a next XSH signal. In the case where the operation is in the middle of sensing a document in the color mode, the LEDs are sequentially switched in the order R, G and B (step S210).

If it is concluded that the operation is in a non-sensing period (step S207), the LEDs are turned off (step S209). This state is maintained until another document to be sensed is given and the operation is restarted. If an image sensing operation is restarted (step S211), when a rising edge of a next XSH signal is detected (step S212) a proper LED is turned on depending on the operation mode. That is, in the case of the monochrome mode, a particular LED specified for use in the monochrome mode is turned on (step S214), while the R LED is turned on again in the case of the color mode. If it is concluded in step S207 that the image sensing operation is completed, the LEDs are turned off (step S216) and the entire process is completed.

Thus as can be seen from the above description, the present embodiment has not only similar advantages to those obtained in the first embodiment but also an advantage that the apparatus consumes less electric power than the first embodiment although the restart of the image sensing operation is slightly delayed.

Embodiment 3

In this third embodiment, even in a non-sensing period, LEDs are turned on in the same manner as in an image sensing period. This embodiment may also be achieved with hardware similar to that employed in the first embodiment described above and therefore the hardware is not described in further detail here.

Figure 20:
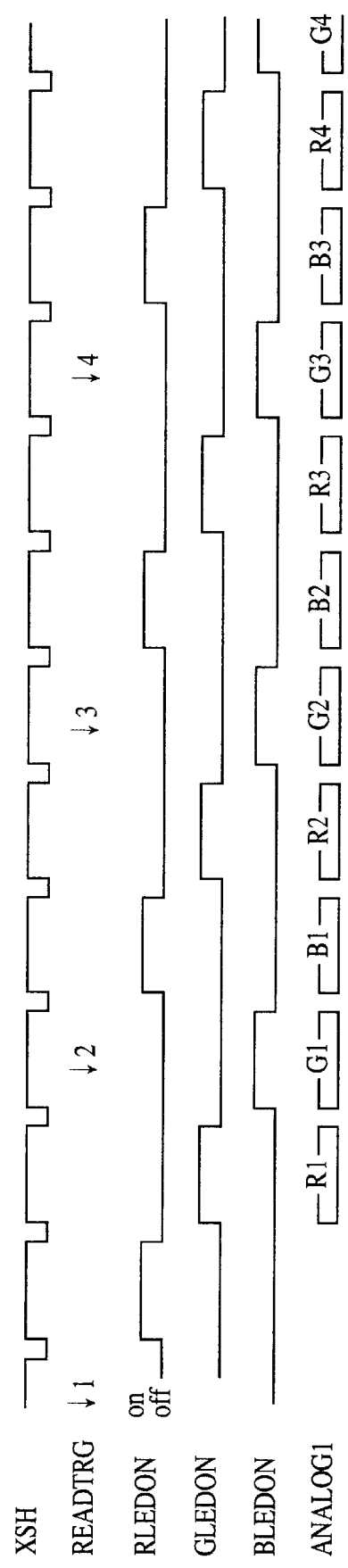
FIG. 20 is a timing chart illustrating the switching control operation of LEDs in a color image sensing mode, according to a third embodiment of the invention.

FIG. 20 illustrates an operation sequence of switching three different LEDs so as to successively sense documents in the color sensing mode. As shown in FIG. 20, the light source LEDs are switched at intervals of one XSH in the order R, G, B.

Figure 21:
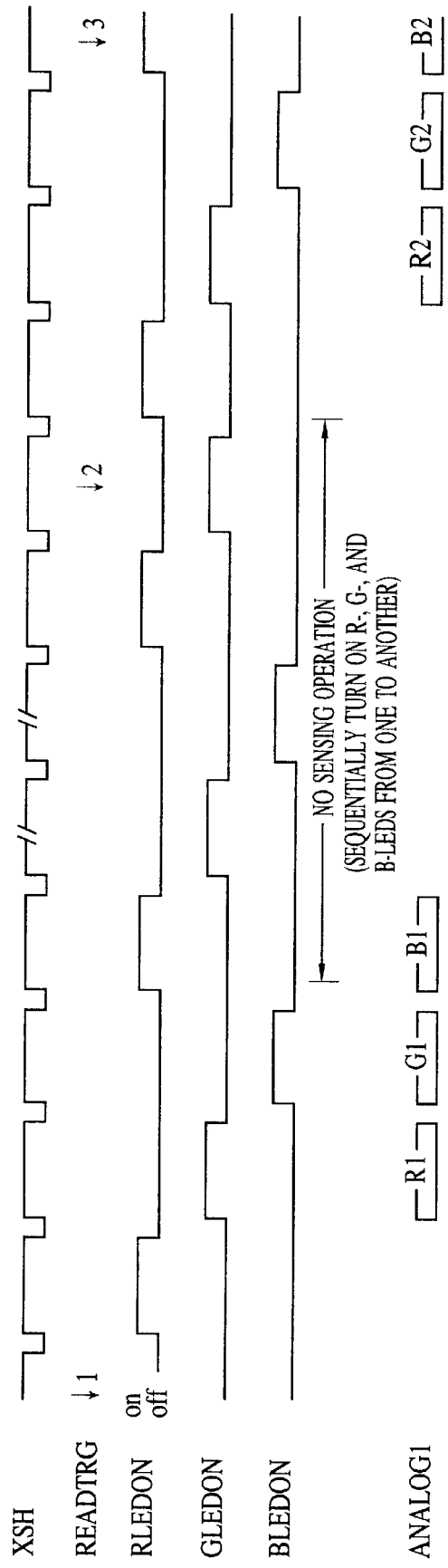
FIG. 21 is a timing chart illustrating the switching control operation of LEDs in the color image sensing mode for the case where no image sensing operation is performed according to the third embodiment of the invention.

FIG. 21 illustrates an operation sequence of switching the LEDs according to the present embodiment, for the case where the image sensing operation is paused in the middle of a color-mode operation in which the three light sources are sequentially turned on.

During the image sensing operation, the light source LEDs are switched at intervals of one XSH in the order R, G, B. Furthermore, in the present embodiment, the light source LEDs are also switched in a similar manner during a non-sensing period as shown in FIG. 21 in contrast to the first embodiment in which only the red LED is maintained in an on-state until the image sensing operation is restarted as shown in FIG. 13.

Figure 22:
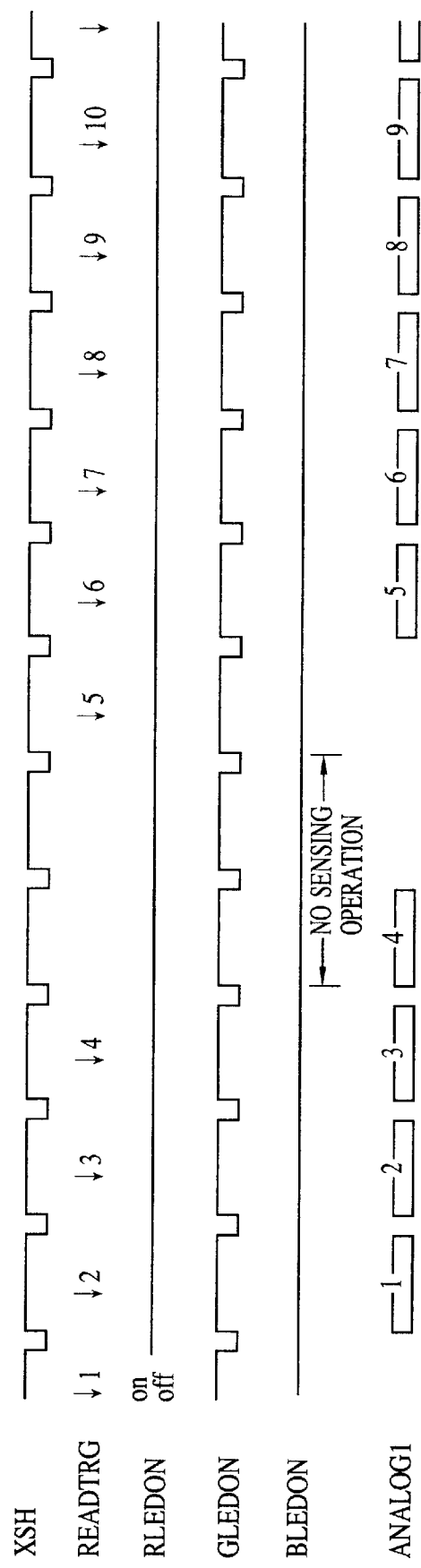
FIG. 22 is a timing chart illustrating the switching control operation of LEDs in a monochrome image sensing mode for the case where no image sensing operation is performed in the third embodiment of the present invention.

FIG. 22 illustrates an operation sequence of switching an LED to in a monochrome sensing mode using one light source.

Figure 23:
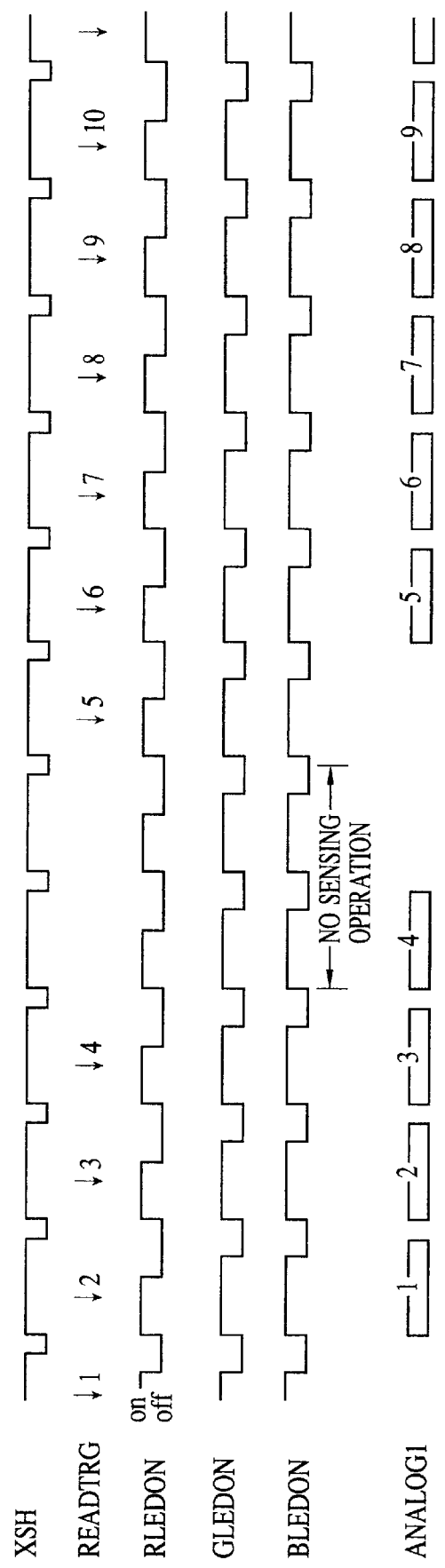
FIG. 23 is a timing chart illustrating the switching control operation of LEDs during a sensing operation in a monochrome image sensing mode using a pseudo-white light source according to the third embodiment of the present invention.

FIG. 23 illustrates an operation sequence of switching LEDs for the case where all three light sources are turned on at the same time so that they act as a pseudo-white light source thereby sensing a document in a monochrome sensing mode.

Figure 24:
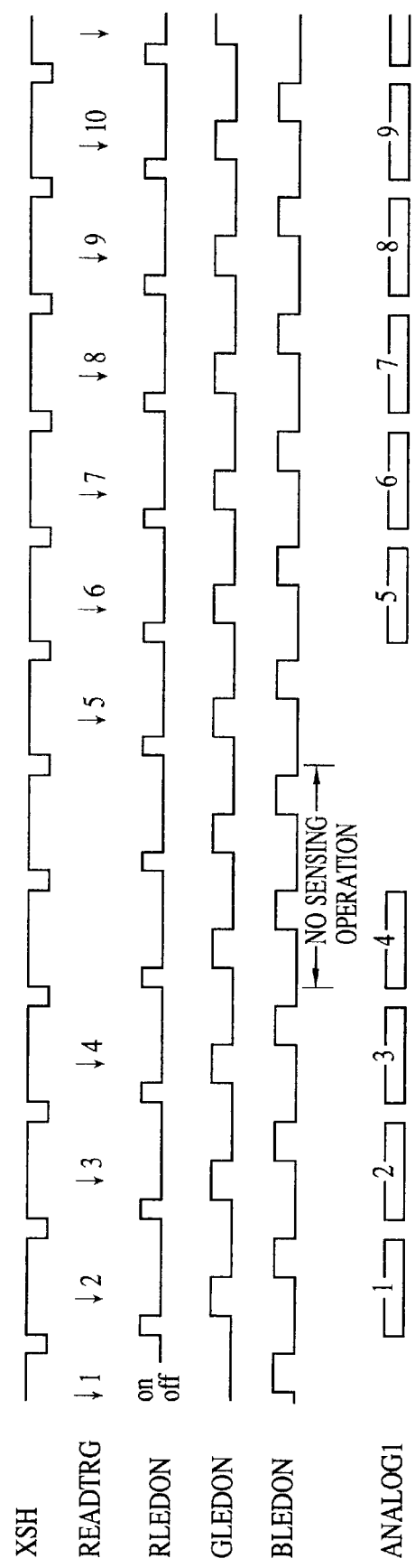
FIG. 24 is a timing chart illustrating the switching control operation of LEDs during a sensing operation in a monochrome image sensing mode using a pseudo-white light source according to the third embodiment of the present invention.

Furthermore, FIG. 24 illustrates an operation sequence of switching LEDs for the case where three light sources are sequentially turned on during each period of XSH so that they act as a pseudo-white light source thereby sensing a document in a monochrome sensing mode. In the techniques shown in FIGS. 23 and 24, the R LED is turned on for a shorter period than the G and B LEDs since the R LED emits higher-intensity light than the G and B LEDs.

In each of the cases shown in FIGS. 21–24, the LEDs are turned on in a similar manner in both an image sensing operation period and a non-image sensing operation period.

Figure 25:
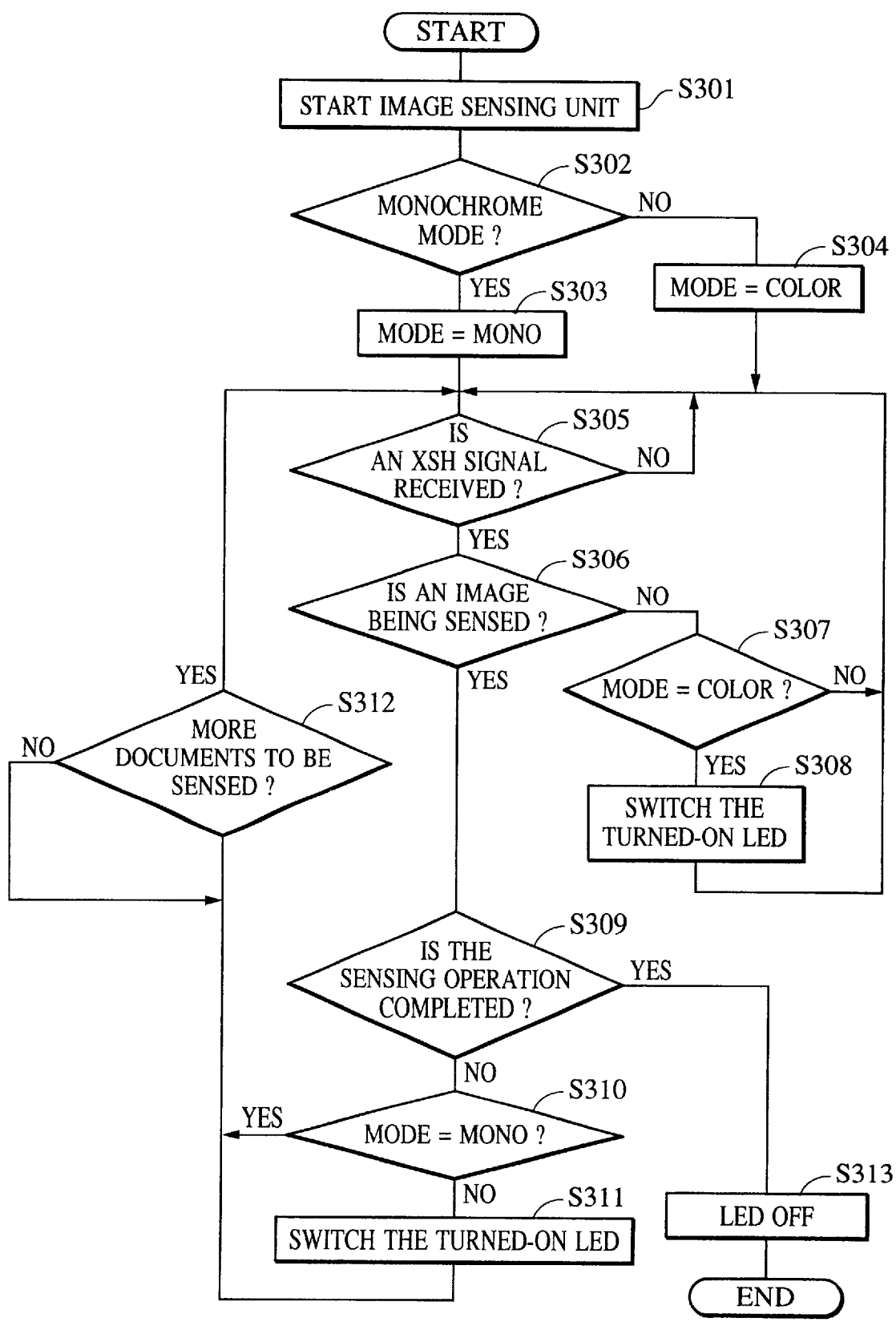
FIG. 25 is a flow chart illustrating the switching control operation of LEDs according to the third embodiment of the invention.

FIG. 25 is a flow chart illustrating the operation of turning on the LEDs. If the image sensing system is started in response to an operation of an operator via the operation panel 110 (step S301), the LED driver 204 is set to a monochrome or color mode in accordance with the specified image sensing mode (steps S303 and S304).

Then an image sensing operation is started. At each rising edge of the XSH signal (step S305), the status of the image sensing operation is monitored (step S306). If the operation is in the middle of sensing a document in the monochrome mode (step S307), the process returns to step S305 to detect a next XSH signal. In the case where the operation is in the middle of sensing a document in the color mode, the LEDs are sequentially switched in the order R, G and B (step S308). If no document is being sensed (step S309), the operation goes to an idling mode. In the case of the monochrome mode, the LEDs are controlled in the same manner as in the image sensing period. In the case of the color mode, the LEDs are sequentially switched in the order R, G, and B in the same manner as in the image sensing period (step S310). This state is maintained until another document to be sensed is given and the operation is restarted (step S311). When an image sensing operation is restarted, if a rising edge of a next XSH signal is detected (step S305) the LEDs are switched so as to sense a document (step S306). If it is concluded in step S309 that the image sensing operation is completed, the LEDs are turned off (step S312) and the entire process is completed.

In the present embodiment, as described above, even in a period in which no document is sensed, the LEDs are controlled in the same manner as in a normal image sensing operation so that the R, G, and B LEDs are maintained at constant temperatures thereby avoiding light intensity variation, which would otherwise occur at the beginning of a restarted image sensing operation, and thus minimizing degradation in image quality.

Embodiment 4

In this fourth embodiment, no LEDs are turned on during a period in which no document is sensed. When an image sensing operation is restarted, a sequence for stabilizing the intensity of light is performed. This embodiment may also be achieved with hardware similar to that employed in the first embodiment described above and therefore the hardware is not described in further detail here.

Figure 26:
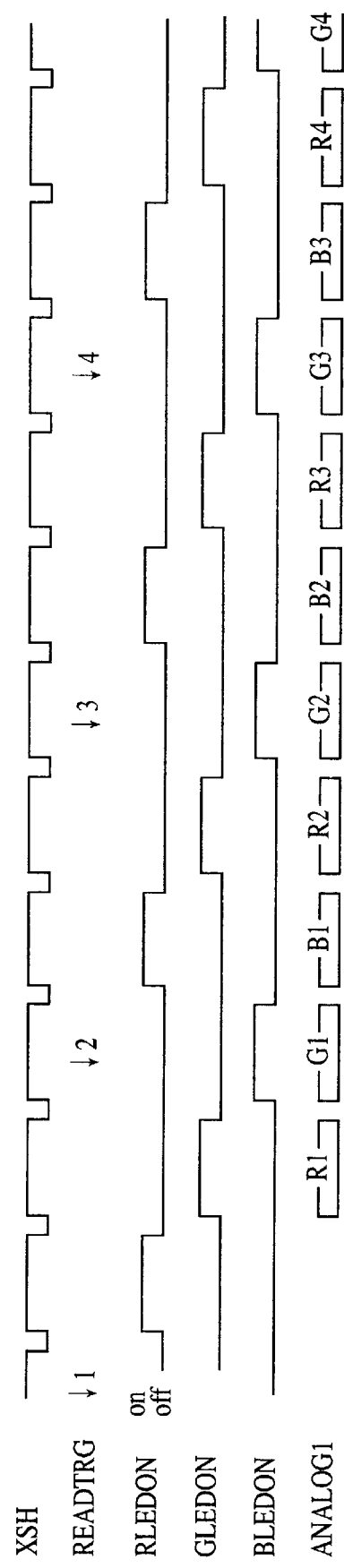
FIG. 26 is a timing chart illustrating the switching control operation of LEDs during a sensing operation in a color image sensing mode according to a fourth embodiment of the invention.
Figure 27:
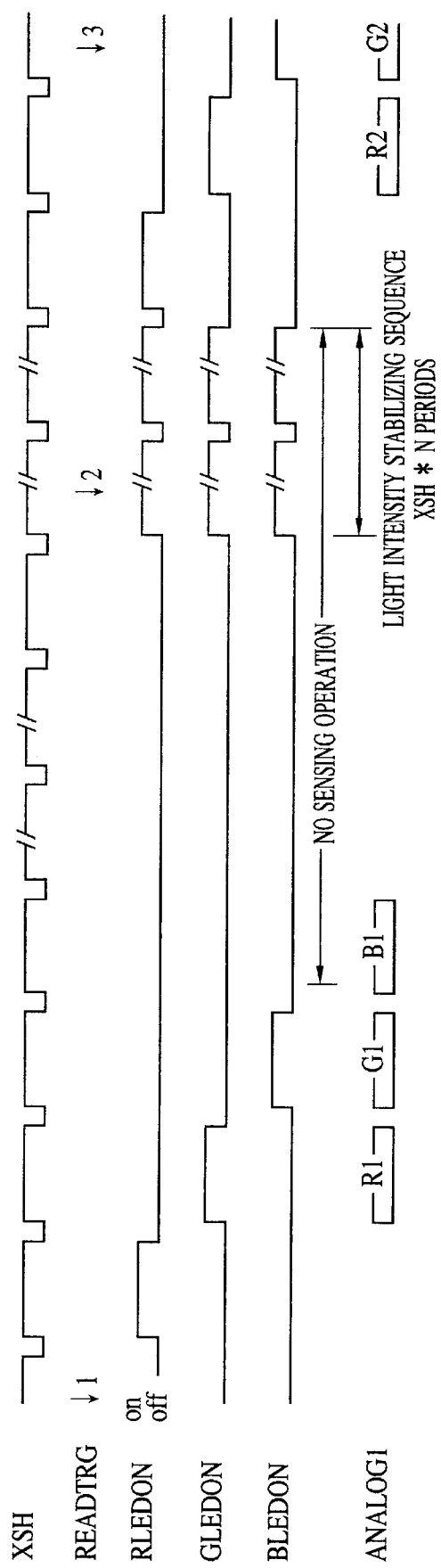
FIG. 27 is a timing chart illustrating the switching control operation of LEDs in the color image sensing mode for the case where no image sensing operation is performed in the fourth embodiment of the invention.

FIG. 26 illustrates an operation sequence of switching three different LEDs so as to successively sense documents in the color sensing mode. In this operation sequence, light source LEDs are switched at intervals of one XSH in the order R, G, and B. FIG. 27 illustrates an operation sequence of switching the LEDs for the case where the image sensing operation is paused in the middle of a color-mode operation in which the three light sources are sequentially turned on. The switching operation of the LEDs is controlled by the LED driver 204. The LED driver 204 outputs signals RLEDON, GLEDON, and BLEDON to the three light source LEDs (RED, GREEN, BLUE), respectively. Each LED is turned on if the given signal (RLEDON, GLEDON, or BLEDON) is at a high level while the LEDs are turned off when the given signal is at a low level.

Figure 28:
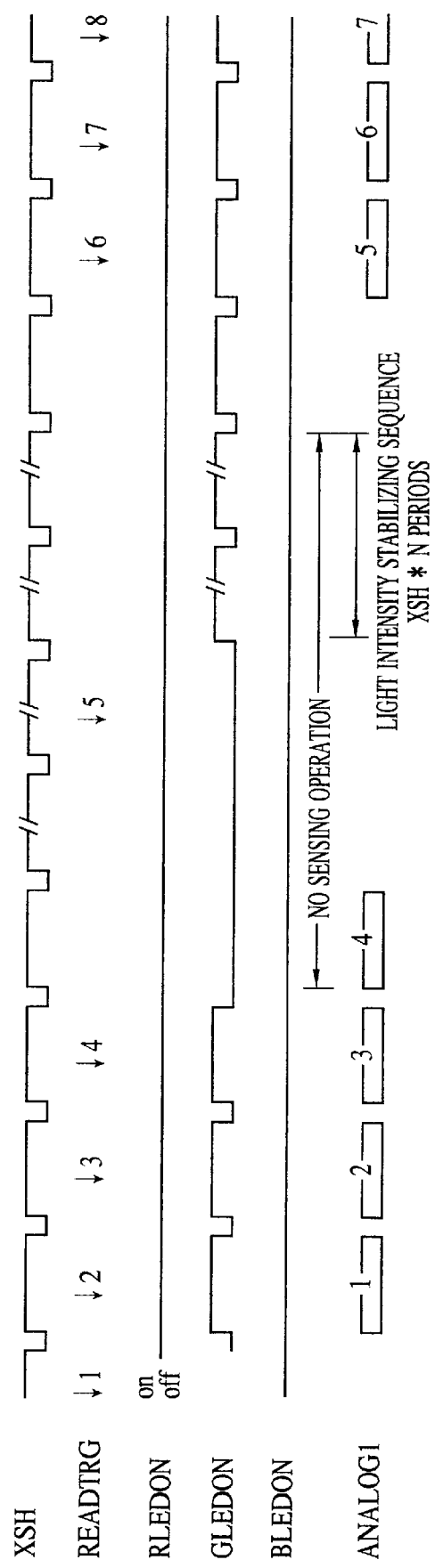
FIG. 28 is a timing chart illustrating the switching control operation of LEDs in a monochrome image sensing mode for the case where no image sensing operation is performed in the fourth embodiment of the present invention.

During the image sensing operation, the light source LEDs are switched at intervals of one XSH in the order R, G, B. However, in the present embodiment, no LEDs are turned on during a non-sensing period in contrast to the first embodiment in which only the red LED is maintained in an on-state until the image sensing operation is restarted as shown in FIG. 13. When an operation of sensing an image is restarted, a light-intensity stabilizing process (LED temperature raising process) is performed at the beginning of the operation. In the stabilizing process, all LEDs are turned on for a period of time equal to the product of a predetermined integer number and XSH. FIG. 28 illustrates an operation sequence of turning on an LED in a monochrome sensing mode using one light source. When no document is sensed, all LEDs are turned off. In a light-intensity stabilizing period after starting an image sensing operation, the G LED specified as a light source for use in the monochrome mode is turned on over a period of time equal to the product of the predetermined integer and XSH.

Figure 29:
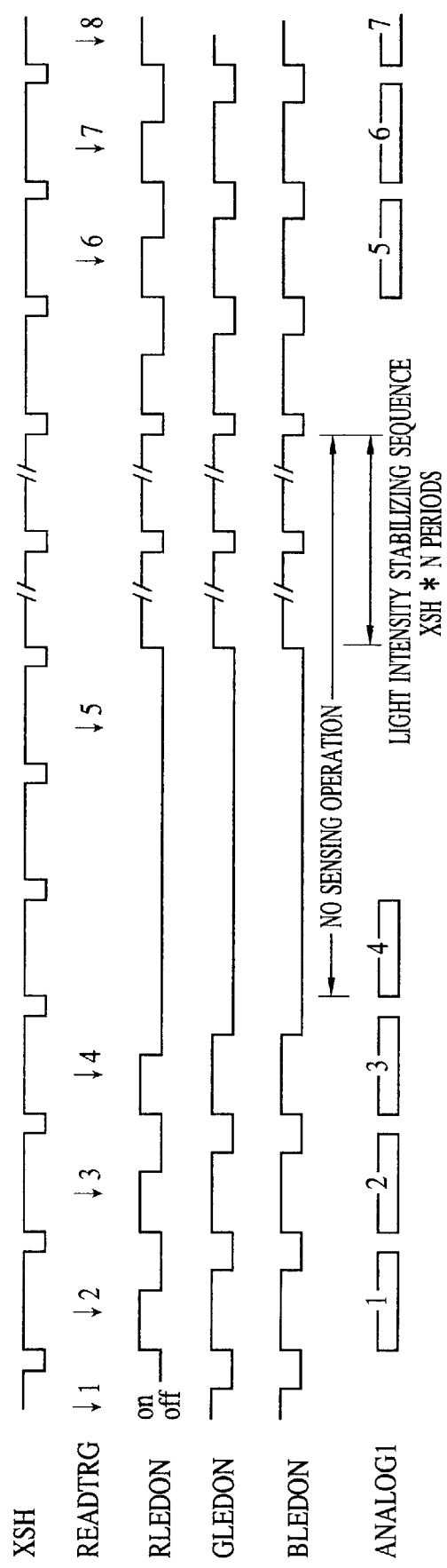
FIG. 29 is a timing chart illustrating the switching control operation of LEDs in a monochrome image sensing mode using a pseudo-white light source in the fourth embodiment of the invention.

FIG. 29 illustrates an operation sequence of switching LEDs for the case where all three light sources are turned on at the same time so that they act as a pseudo-white light source thereby sensing a document in a monochrome sensing mode. When no document is sensed, all LEDs are turned off. In a light-intensity stabilizing period at the beginning of a restart of an image sensing operation, LEDs of all colors are turned on over a period of time equal to the product of the predetermined integer and XSH.

Figure 30:
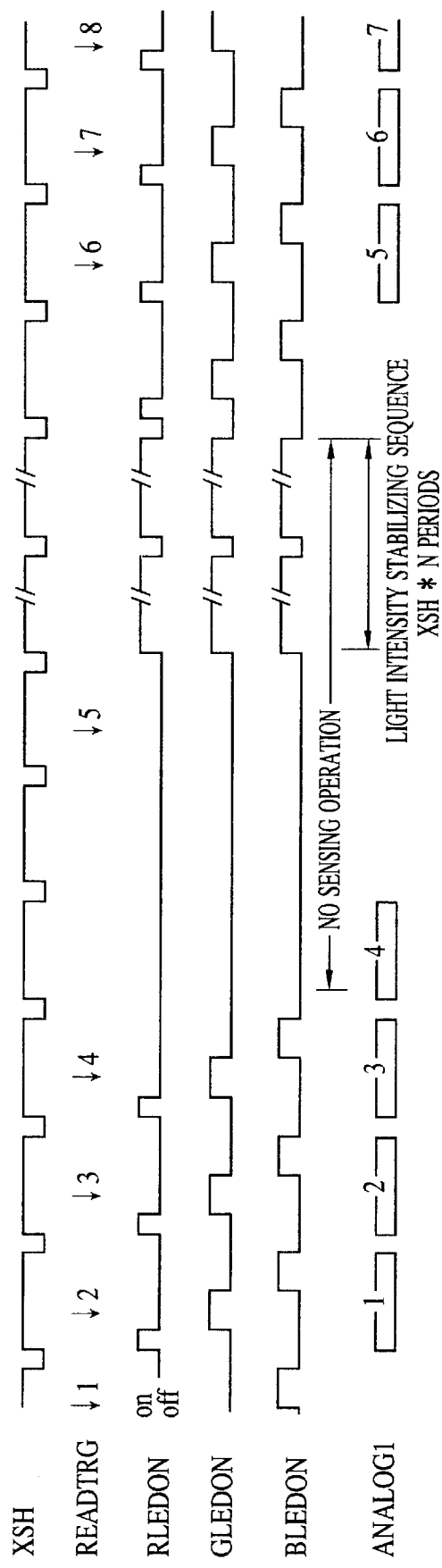
FIG. 30 is a timing chart illustrating the switching control operation of LEDs in a monochrome image sensing mode using a pseudo-white light source in the fourth embodiment of the invention.

FIG. 30 illustrates an operation sequence of switching LEDs for the case where three light sources are sequentially turned on during each period of XSH so that they act as a pseudo-white light source thereby sensing a document in a monochrome sensing mode.

In the techniques shown in FIGS. 29 and 30, the R LED is turned on for a shorter period than the G and B LEDs because the R LED emits higher-intensity light than the G and B LEDs.

Figure 31:
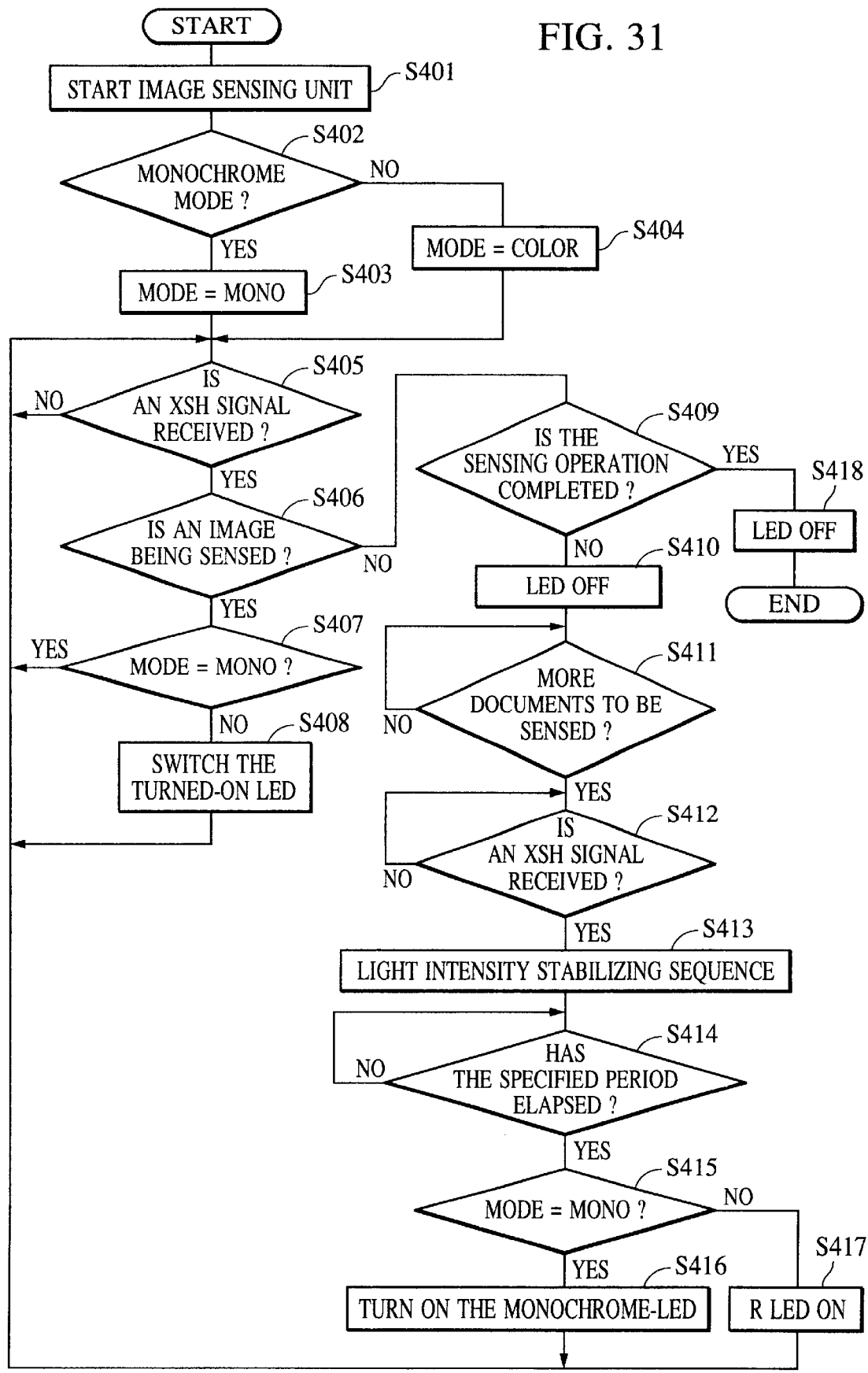
FIG. 31 is a flow chart illustrating the switching control operation of LEDs according to the fourth embodiment of the invention.

FIG. 31 is a flow chart illustrating the operation of turning on the LEDs. If the image sensing system is started in response to an operation of an operator via the operation panel 110 (step S401), the LED driver 204 is set to a monochrome or color mode in accordance with the specified image sensing mode (steps S403 and S404).

Then an image sensing operation is started. At each rising edge of the XSH signal (step S405), the status of the image sensing operation is monitored (step S406). If the operation is in the middle of sensing a document in the monochrome mode, the process returns to step S405 to detect a next XSH signal. In the case where the operation is in the middle of sensing a document in the color mode, the LEDs are sequentially switched in the order R, G and B (step S408). If no document is being sensed (step S406, S409), the operation goes to an idling mode and LEDs are turned off (step S410). This state is maintained until another document to be sensed is given and the operation is restarted. When an image sensing operation is restarted (step S411), if a rising edge of a next XSH signal is detected (step S412), an LED intensity stabilizing sequence is performed in a manner depending on a specified mode for a predetermined period of time (steps S413, S414). That is, in the case of the monochrome mode, particular LEDs specified for use in the monochrome mode are turned on (step S416), while the R LED is turned on again in the case of the color mode (step S417). Then the LEDs are switched so as to sense a document (step steps S405–408). If it is concluded in step S409 that the image sensing operation is completed, the LEDs are turned off and the whole process is completed.

In the present embodiment, as described above, when an image sensing operation is completed, LEDs are turned off and the process goes to a waiting state. If the image sensing operation is restarted, a light intensity stabilizing process is performed at the beginning of the restarted operation so that the variation in light intensity and the degradation in image quality are minimized without leading to either an increase in the electric power consumption or degradation in the characteristics of LEDs. Furthermore, instead of performing the light intensity stabilizing sequence a fixed number of times, the output of the sensor may be monitored and the stabilizing sequence may be stopped when the output of the sensor becomes stable. This makes it possible to stabilize the light intensity in a shorter period of time.

As described above, the present invention provides a high-performance and small-sized image sensing apparatus at a low cost.

What is claimed is:

1. An image sensing apparatus comprising:
   (a) a light source which emits a first light, a second light, and a third light which are different in wavelength; and
   (b) a sensing unit which, in response to the trigger signal for triggering an operation of sensing one line of an image, outputs in a first period, a signal of one line of an image illuminated with the emitted light,
   wherein the first light, the second light, and the third light are continuously turned on and off in this order in the first period, and the first light, the second light, and the third light are continuously turned on and off in this order in a second period during which the trigger signal is not generated over a length of time greater than the first period.

2. An apparatus according to claim 1, wherein said light source continuously turns on and off the first, the second and the third light so that said sensing unit may sense an image in a color mode.

3. An apparatus according to claim 1, wherein said light source continuously turns on and off the first, the second and the third light so that said sensing unit may sense an image in a monochrome mode.

4. An apparatus according to claim 1, wherein said sensing unit outputs a signal a plurality of times during the first period.

5. An apparatus according to claim 1, wherein said sensing unit outputs a signal once during the first period.

6. An apparatus according to claim 1, wherein said said first, second, and third light include light with wavelengths corresponding to red, green, and blue.

7. An apparatus according to claim 1, wherein a predetermined color light is turned on when the trigger signal is generated during the second period regardless of the present emitting color of light.

8. An apparatus according to claim 1, wherein the the first light is emitted in a case where light other than the first light is being emitted when the trigger signal is generated in the second period.

9. An apparatus according to claim 8, wherein the first light is light which is first emitted at the beginning of a sensing operation performed by the sensing unit.

10. An apparatus according to claim 8, wherein the first light is light which is slower in a rising speed when being turned on than the second and third light.

11. An apparatus according to claim 8, wherein the first, the second, and the third lights are continuously turned on and off whereby the sensing unit senses a color image.

12. An apparatus according to claim 8, wherein the first, the second, and the third lights are continuously turned on and off whereby the sensing unit senses a monochrome image.

13. An apparatus according to claim 8, wherein the sensing unit outputs a signal a plurality of times during the first period.

14. An apparatus according to claim 8, wherein the sensing unit outputs a signal once during the first period.

15. An apparatus according to claim 8, wherein the first light, the second light, and the third light are each one of red light, green light, and blue light.

16. A method of sensing an image, comprising the steps of:
    (a) generating a trigger signal for triggering an operation of sensing one line of an image;
    (b) continuously turning on and off a first, a second, and a third light in a one-line sensing period, wherein the first light, the second light, and the third light are different in wavelength;
    (c) in response to the trigger signal, outputting in a first period, a signal of one line of the image illuminated with the emitted light; and
    (d) continuously turning on and off the first light, the second light, and the third light in this order in a second period during which the trigger signal is not generated over a length of time greater than the first period.

17. A method of sensing an image according to claim 16, wherein the first, the second and the third light sources are continuously turned on and off thereby sensing an image in a color mode.

18. A method of sensing an image according to claim 16, wherein the first, the second and the third light sources are continuously turned on and off thereby sensing an image in a monochrome mode.

19. A method of sensing an image according to claim 16, wherein the signal of one line of the image is output a plurality of times during the first period.

20. A method of sensing an image according to claim 16, wherein the signal of one line of the image signal is output once during the first sensing period.

21. A method of sensing an image according to claim 16, wherein the first, second, and third light include light with wavelengths corresponding to red, green and blue.

22. A method according to claim 16, wherein a predetermined color light is turned on when the trigger signal is generated during the second period regardless of the present emitting color of light.

23. A method of sensing an image according to claim 16, further comprising the step of:
    emitting the first light in a case where light other than the first light is being emitted when the trigger signal is generated in the second period.

24. A method of sensing an image according to claim 23, wherein the first light is light which is first emitted at the beginning of a sensing operation.

25. A method of sensing an image according to claim 23, wherein the first light is light which is slower in a rising speed when being turned on than the second and third light.

26. A method of sensing an image according to claim 23, wherein said step of continuously turning on and off of first, second and third lights is carried out by a light source control unit which controls a light source such that the first, the second and the third lights are continuously turned on and off whereby a sensing unit senses a color image.

27. A method of sensing an image according to claim 23, wherein said step of continuously turning on and off of first, second and third lights is carried out by operation of a light source control unit which controls a light source such that the first, the second and the third lights are continuously turned on and off, and whereby a sensing unit senses a monochrome image.

28. A method of sensing an image according to claim 23, wherein a sensing unit outputs the signal of one line of the image a plurality of times during the first period.

29. A method of sensing an image according to claim 23, wherein a sensing unit outputs the signal of one line of the image once during the first period.

30. A method of sensing an image according to claim 23, wherein the first light, the second light, and the third light are each one of red light, green light, and blue light.

31. A control memory in which is stored a program comprising the steps of:
   (a) generating a trigger signal for triggering an operation of sensing one line of an image;
   (b) continuously turning on and off a first, a second, and a third light in a one-line sensing period, wherein the first light, the second light, and the third light are different in wavelength;
   (c) in response to the trigger signal, oputputting, in a first period, a signal of one line of the image illuminated with the emitted light; and
   (d) continuously turning on and off the first, the second, and the third light in this order in a second period during which the trigger signal is not generated over a length of time greater than the first period.

32. A control memory according to claim 31, wherein said program continuoursly turns on and off the first, the second and the third light sources for sensing an image in a color mode.

33. A control memory according to claim 31, wherein said program continuously turns on and off the first, the second and the third light source for sensing an image in a monochrome mode.

34. A control memory according to claim 31, wherein the signal of one line of the image is output a plurality of times during the first period.

35. A control memory according to claim 31, wherein the signal of one line of the image is output once during the first period.

36. A control memory according to claim 31, wherein the first, second, and third light include light with wavelengths corresponding to red, green and blue.

37. A control memory according to claim 31, wherein a predetermined color light is turned on when the trigger signal is generated during the second period regardless of the present emitting color of light.

38. A control memory according to claim 31, said program further comprising the step of:
   emitting the first light in a case where light other than the first light is being emitted when the trigger signal is generated in the second period.

39. A control memory according to claim 38, wherein the first light is light which is first emitted at the beginning of a sensing operation.

40. A control memory according to claim 38, wherein the first light is light which is slower in a rising speed when being turned on than the second and third light.

41. A control memory according to claim 38, wherein said step of continuously turning on and off of first, second and third lights is carried out by operation of a light source control unit which controls a light source such that the first, the second and the third lights are continuously turned on and off, and whereby a sensing unit senses a color image.

42. A control memory according to claim 38, wherein the first, the second and the third lights are continuously turned on and off, and whereby a sensing unit senses a monochrome image.

43. A control memory according to claim 38, wherein the signal of one line of the image is output a plurality of times during the first period.

44. A control memory according to claim 38, wherein the signal of one line of the image is output once during the first period.

45. A control memory according to claim 38, wherein the first light, the second light, and the third light are each one of red light, green light, and blue light.

46. An image sensing apparatus comprising:
   (a) a light source which emits a first light, a second light and a third light which are different in wavelength; and
   (b) a sensing unit which accumulates valid data of an image illuminated with the emitted light in a first period in response to a trigger signal for triggering an operation of sensing one line of an image, and accumulates invalid data in a second period,
   wherein the first light, the second light, and the third light are continuously turned on and off in this order in the first second period, and the first light is turned on in the beginning of the first period in a case that the trigger signal is generated in the second period.

47. An apparatus according claim 46, wherein the first, the second and the third lights are continuously turned on and off whereby the sensing unit senses a color image.

48. An apparatus according to claim 46, wherein the first, the second and the third lights are continuously turned on and off whereby the sensing unit senses a monochrome image.

49. An apparatus according to claim 46, wherein said first, second, and third light include light with wavelengths corresponding to red, green, and blue.

50. A method of sensing an image, comprising the steps of:
   (a) emitting a first, a second, and a third light which are different in wavelength;
   (b) generating a trigger signal for triggering an operation of sensing one line of an image;
   (c) accumulating valid data of the image illuminating with the emitted light in a first period in response to the trigger signal and invalid data in a second period;
   (d) continuously turning on and off the first light, the second light, and the third light in this order in the first and second period; and
   (e) turning on the first light in the beginning of the first period in a case that the trigger signal is generated in the second period.

51. A method of sensing an image according to claim 50, wherein said step of continuously turning on and off of the first, second and third lights is carried out by a light source control unit which controls a light source such that the first, the second and the third lights are continuously turned on and off whereby a sensing unit senses a color image.

52. A method of sensing an image according to claim 50, wherein said step of continuously turning on and off of first, second and third lights is carried out by a light source control unit which controls a light source such that the first, the second and the third lights are continuously turned on and off whereby a sensing unit senses a monochrome image.

53. A method of sensing an image according to claim 50, wherein the first light, the second light, and the third light are each one of red light, green light, and blue light.

54. A control memory in which is stored a program comprising the steps of:
   (a) emitting a first, a second, a third light which are different in wavelength;

(b) generating a trigger signal for triggering an operation of sensing one line of an image;

(c) accumulating valid data of the image illuminated with the emitted light in a first period in response to the trigger signal and invalid data in a second period;

(d) continuously turning on and off the first light, the second light, and the third light in this order in the first and second period; and (e) turning on the first light in the beginning of the first period in a case that the trigger signal is generated in the second period.

55. A control memory according to claim 54, wherein said step of continuously turning on or off of first, second and third lights is carried out by a light source control unit which controls a light source such that the first, the second and the third lights are continuously turned on and off whereby a sensing unit senses a monochrome image.

56. A control memory according to claim 54, wherein said step of continuously turning on and off of first, second and third lights is carried out by a light source control unit which controls a light source such that the first, the second and the third lights are continuously turned on and off whereby a sensing unit senses a monochrome image.

57. A control memory according to claim 54, wherein the first light, the second light, and the third light are each one of red light, green light, and blue light.

* * * * *

UNITED STATES PATENT AND TRADEMARK OFFICE
CERTIFICATE OF CORRECTION

PATENT NO. : 7,071,979 B1
APPLICATION NO. : 08/878581
DATED : July 4, 2006
INVENTOR(S) : Atsushi Ohtani et al.

It is certified that error appears in the above-identified patent and that said Letters Patent is hereby corrected as shown below:

<u>COLUMN 1</u>

Line 7, "an" should be deleted; and
Line 24, "used" should read --is used--.

<u>COLUMN 9</u>

Line 53, "is" should read --are--.

<u>COLUMN 10</u>

Line 57, "in" should be deleted.

<u>COLUMN 12</u>

Line 63, "(step steps" should read --(steps--.

<u>COLUMN 13</u>

Line 44, "said said" should read --said--.

<u>COLUMN 16</u>

Line 20, "first second period" should read --first and second periods--;
Line 39, "illuminating" should read --illuminated--;
Line 44, "period;" should read --periods;--; and
Line 65, "a third" should read --and a third--.

UNITED STATES PATENT AND TRADEMARK OFFICE
CERTIFICATE OF CORRECTION

PATENT NO. : 7,071,979 B1
APPLICATION NO. : 08/878581
DATED : July 4, 2006
INVENTOR(S) : Atsushi Ohtani et al.

It is certified that error appears in the above-identified patent and that said Letters Patent is hereby corrected as shown below:

COLUMN 17

Line 8, "period" should read --periods--.

Signed and Sealed this

Sixteenth Day of January, 2007

JON W. DUDAS
*Director of the United States Patent and Trademark Office*